US012584459B2

(12) United States Patent
Yu

(10) Patent No.: US 12,584,459 B2
(45) Date of Patent: Mar. 24, 2026

---

(54) FLOATING HYBRID DARRIEUS-SAVONIUS TIDAL/WAVE/WIND HARVESTING SYSTEM

(71) Applicant: UNIVERSITY OF MARYLAND, BALTIMORE COUNTY, Baltimore, MD (US)

(72) Inventor: Meilin Yu, Ellicott City, MD (US)

(73) Assignee: University of Maryland, Baltimore County, Baltimore, MD (US)

( * ) Notice: Subject to any disclaimer, the term of this patent is extended or adjusted under 35 U.S.C. 154(b) by 0 days.

(21) Appl. No.: 18/642,021

(22) Filed: Apr. 22, 2024

(65) Prior Publication Data

US 2024/0280081 A1 Aug. 22, 2024

Related U.S. Application Data

(63) Continuation of application No. PCT/US2022/078680, filed on Oct. 26, 2022.

(Continued)

(51) Int. Cl.
*F03D 9/00* (2016.01)
*F03B 17/06* (2006.01)
(Continued)

(52) U.S. Cl.
CPC ............ *F03D 9/008* (2013.01); *F03B 17/063* (2013.01); *F03D 3/009* (2023.08); *F03D 3/011* (2023.08); *F03D 9/25* (2016.05); *F05B 2220/703* (2020.08); *F05B 2220/705* (2020.08); *F05B 2220/706* (2013.01); *F05B 2240/212* (2013.01); *F05B 2240/213* (2013.01)

(58) Field of Classification Search
CPC ... F03D 9/008; F03D 9/25; F03D 9/00; F03D 3/011; F03D 3/009; F03D 3/00; F03D 3/02; F03D 3/06; F03B 13/00; F03B 13/26; F05B 2240/212; F05B 2240/213; F05B 2220/703; F05B 2220/705; F05B 2220/706

See application file for complete search history.

(56) References Cited

U.S. PATENT DOCUMENTS

| | | |
|---|---|---|
| 1,697,574 A | 1/1929 | Savonius |
| 1,766,765 A | 6/1930 | Savonius |
| | (Continued) | |

FOREIGN PATENT DOCUMENTS

| | | | |
|---|---|---|---|
| CN | 105649884 A | * | 6/2016 |
| DE | 10064472 A1 | | 6/2002 |
| | (Continued) | | |

OTHER PUBLICATIONS

"2010 Census: Maryland Profile, Population Density by Census Tract," U.S. Census Bureau. 1 page.

(Continued)

*Primary Examiner* — Courtney D Heinle
*Assistant Examiner* — Ryan C Clark
(74) *Attorney, Agent, or Firm* — Casimir Jones, S.C.; Tristan A. Fuierer

(57) ABSTRACT

A floating hybrid tidal/wave/wind energy harvesting system is described, wherein the system is based on vertical axis turbines for synergized tidal, wave and wind energy production. The system is self-starting and can continuously, and simultaneously, harvest wind and tidal energy in a wide range of wind and tidal current speeds.

20 Claims, 15 Drawing Sheets

Related U.S. Application Data

(60) Provisional application No. 63/271,733, filed on Oct. 26, 2021.

(51) Int. Cl.
    *F03D 3/00*         (2006.01)
    *F03D 9/25*         (2016.01)

(56) References Cited

U.S. PATENT DOCUMENTS

| | | | |
|---|---|---|---|
| 1,835,018 A | 12/1931 | Darrieus | |
| 3,918,839 A | 11/1975 | Blackwell et al. | |
| 4,206,608 A | 6/1980 | Bell | |
| 4,464,579 A | 8/1984 | Schwarz | |
| 7,362,004 B2 | 4/2008 | Becker | |
| 8,790,069 B2 | 7/2014 | Anderson | |
| 11,303,348 B1 | 4/2022 | Staple et al. | |
| 11,313,348 B2 | 4/2022 | Yu et al. | |
| 11,859,716 B2 | 1/2024 | Zhu et al. | |
| 2009/0028706 A1* | 1/2009 | Ioana | F03D 7/06 |
| | | | 416/223 R |
| 2011/0097200 A1* | 4/2011 | Tai | F03D 9/25 |
| | | | 290/55 |
| 2011/0142641 A1 | 6/2011 | Anderson | |
| 2020/0332764 A1* | 10/2020 | Yu | F03D 3/005 |
| 2021/0262443 A1 | 8/2021 | Goldblatt et al. | |
| 2022/0320836 A1 | 10/2022 | Heggedal et al. | |

FOREIGN PATENT DOCUMENTS

| | | | |
|---|---|---|---|
| EP | 1637733 A1 | | 3/2006 |
| GB | 2351124 A | | 12/2000 |
| JP | 11044288 A | | 2/1999 |
| JP | 2008063960 A | * | 3/2008 |
| KR | 20100099794 A | * | 9/2010 |
| KR | 10-2012-0095752 | | 8/2012 |
| KR | 10-1425547 B1 | | 8/2014 |
| WO | 2003016714 A1 | | 2/2003 |
| WO | 2008062319 A2 | | 5/2008 |
| WO | 2011039536 A1 | | 4/2011 |

OTHER PUBLICATIONS

"DSIRE, Maryland, Renewable Energy Portfolio Standard," NC Clean Energy Technology Center, 2018. 5 pages.

"Economic Research Service, Maryland, Three rural definitions based on Census Places," U.S. Department of Agriculture, 2018. Can Not Locate Reference.

"Electricity installed generating capacity by country," MECOMeter. [Online]. [Accessed Sep. 3, 2020]. Retrieved from web archive. 7 pages.

"Maryland Geography," World Atlas. [Online]. [Accessed Sep. 3, 2020]. 3 pages.

"Maryland State Profile and Energy Estimates," U.S. Energy Information Administration (EIA), 2018. 4 pages.

"State Energy Consumption Estimates 1960 Through 2016, DOE/ EIA-0214(2016), Total Energy Consumption Estimates, Real Gross Domestic Product (GDP), Energy Consumption Estimates per Real Dollar of GDP, Ranked by State, 2016.," U.S. Energy Information Administration (EIA), 2017. 787 pages.

"Tidal Energy Technology Brief," International Renewable Energy Agency (IRENA), 2014. 36 pages.

"Wind energy for rural economic development," U.S. Department of Energy (DOE), Office of Energy Efficiency and Renewable Energy (EERE), DOE/GO-102004-1826, 2004. 8 pages.

Al-Mulali et al., Exploring the relationship between urbanization, energy consumption, and CO2 emission in MENA countries, Renew. Sustain. Energy Rev., 23 (2013), pp. 107-112.

Altan et al., An experimental and numerical study on the improvement of the performance of Savonius wind rotor, Energy Convers. Manag., 49 (12) (2008), pp. 3425-3432.

Araya et al., A comparison of wake measurements in motor-driven and flow-driven turbine experiments, Exp. Fluid, 2015; 56 (7): 15 pages.

Baker. Features to aid or enable self starting of fixed pitch low solidity vertical axis wind turbines, J. Wind Eng. Ind. Aerod., 15 (1) (1983), pp. 369-380.

Bazilevs et al., Fluid-structure interaction modeling of vertical-Axis wind turbines, J. Appl. Mech., 81 (8) (2014), 081006-081006-8, 8 pages.

Beri et al., Double multiple streamtube model and numerical analysis of vertical Axis wind turbine, Energy Power Eng., 3 (3) (2011), pp. 262-270.

Betz, Introduction to the Theory of Flow Machines, Pergamon Press, Oxford, UK (1966). TOC only. 25 pages.

Bhutta et al., Vertical axis wind turbine—a review of various configurations and design techniques, Renew. Sustain. Energy Rev., 16 (4) (2012), pp. 1926-1939.

Bhuyan et al., Investigations on self-starting and performance characteristics of simple H and hybrid H-Savonius vertical axis wind rotors—science direct, Energy Convers. Manag., 87 (2014), pp. 859-867.

Buchner et al., Dynamic stall in vertical axis wind turbines: comparing experiments and computations, J. Wind Eng. Ind. Aerod., 146 (2015), pp. 163-171.

Castelli et al., Effect of blade inclination angle on a Darrieus wind turbine, J. Turbomach., 2012, 134(3), 031016, 10 pages.

Castelli et al., Modeling strategy and numerical validation for a Darrieus vertical Axis micro-wind turbine, ASME 2010 International Mechanical Engineering Congress & Exposition, Vancouver, British Columbia, Canada (2010) 10 pages.

Dabiri et al., A new approach to wind energy: opportunities and challenges, AIP Conf. Proc., 1652 (2015), pp. 51-57.

Dabiri, Emergent aerodynamics in wind farms, Phys. Today, 67 (10) (2014), pp. 66-67.

Dabiri. Potential order-of-magnitude enhancement of wind farm power density via counter-rotating vertical-axis wind turbine arrays, J. Renew. Sustain. Energy, 3 (4) (2011), pp. 043104, 13 pages.

Damak et al., Experimental investigation of helical Savonius rotor with a twist of 180°, Renew. Energy, 52 (2013), pp. 136-142.

Danao et al., A numerical investigation into the influence of unsteady wind on the performance and aerodynamics of a vertical axis wind turbine, Appl. Energy, 116 (2014), pp. 111-124.

Danao et al., An experimental investigation into the influence of unsteady wind on the performance of a vertical axis wind turbine, Appl. Energy, 107 (2013), pp. 403-411.

Debnath et al., Computational fluid dynamics analysis of a combined three-bucket Savonius and three-bladed Darrieus rot, J. Renew. Sustain. Energy, 1 (3) (2009), Article 033110. 14 pages.

Denny, The economics of tidal energy. Energy Policy, 2009, vol. 37, pp. 1914-1924.

Dominy et al., Self-starting capability of a Darrieus turbine, Proc. IME J. Power Energy, 2007, 221 (1), 111-120.

Eriksson et al., Evaluation of different turbine concepts for wind power, Renew. Sustain. Energy Rev., 12 (5) (2008), pp. 1419-1434.

Ferreira et al., 2D PIV visualization of dynamic stall on a vertical Axis wind turbine, 45th AIAA Aerospace Sciences Meeting and Exhibit, Reno, Nevada (2007) 16 pages.

Gavalda et al., Experimental study on a self-adapting Darrieus-Savonius wind machine, Sol. Wind Technol., 7 (4) (1990), pp. 457-461.

Global Vertical Axis Wind Turbine Market Research Report 2020, Industry Research, 2020; Abstract Only.

Groth et al., Rural wind farm development: Social, environmental and economic features important to local residents. Renewable Energy, 2014, vol. 63, pp. 1-8.

Gupta et al., Computational fluid dynamics analysis of a twisted three bladed H-Darrieus rotor, J. Renew. Sustain. Energy, 2 (4) (2010), Article 043111. 16 pages.

Hill et al., Darrieus turbines: the physics of self-starting, Proc. IME J. Power Energy, 223 (1) (2009), pp. 21-29.

Hitaj et al., Trends in U.S. Agriculture's Consumption and Production of Energy: Renewable Power, Shale Energy, and Cellulosic Biomass. United States Department of Agriculture, 2016. 53 pages.

(56) References Cited

OTHER PUBLICATIONS

Houlsby et al., The power available to tidal turbines in an open channel flow. Proceedings of the Institution of Civil Engineers—Energy, 2017, vol. 170, pp. 12-21.

International Search Report and Written Opinion for PCT/US2022/078680. Mailed Feb. 23, 2023. 11 pages.

Irabu et al., Characteristics of wind power on Savonius rotor using a guide-box tunnel, Exp. Therm. Fluid Sci., 32 (2) (2007), pp. 580-586.

Ishugah et al., Advances in wind energy resource exploitation in urban environment: a review, Renew. Sustain. Energy Rev., 37 (2014), pp. 613-626.

Islam et al., Aerodynamic models for Darrieus-type straight-bladed vertical axis wind turbines, Renew. Sustain. Energy Rev., 12 (4) (2008), pp. 1087-1109.

Kamojia et al., Performance tests on helical Savonius rotors. Renewable Energy, 2009, vol. 34, pp. 521-529.

Kang et al., Review of fluid dynamics aspects of Savonius-rotor-based vertical-axis wind rotors, Renew. Sustain. Energy Rev., 33 (2014), pp. 499-508.

Kerr et al., Understanding community benefit payments from renewable energy development. Energy Policy, 2017, vol. 105, pp. 202-211.

Kinzel et al., Energy exchange in an array of vertical-axis wind turbines, J. Turbul., 13 (2012), 15 pages.

Kirke et al., Enhancing the performance of vertical axis wind turbine using a simple variable pitch system, Wind Eng., 15 (4) (1991), pp. 187-195.

Kou et al., Modeling analysis and experimental research on a combined-type vertical axis wind turbine, 2011 International Conference on Electronics, Communications and Control (ICECC), Ningbo, China (2011) 5 pages.

Kyozuka, An experimental study on the darrieus-savonius turbine for the tidal current power generation, J. Fluid Sci. Technol., 3 (2008), pp. 439-449.

Laws et al., Hydrokinetic energy conversion: Technology, research, and outlook. Renewable and Sustainable Energy Reviews, 2016, vol. 57, pp. 1245-1259.

Li et al., 2.5D large eddy simulation of vertical axis wind turbine in consideration of high angle of attack flow, Renew. Energy, 51 (2013), pp. 317-330.

Liu et al., Enhancing wind energy harvesting performance of vertical axis wind turbines with a new gybrid design: A fluid-structure interaction study. Renewable Energy, 2019, vol. 140, pp. 912-927.

Liu et al., Performance analysis of vertical axis water turbines under single-phase water and two-phase open channel flow conditions. Ocean Engineering, Oct. 15, 2021, vol. 238, 106769, 36 pages.

Mabrouk et al., Effect of number of blades on the dynamic behavior of a Darrieus turbine geared transmission system. Mechanical Systems and Signal Processing, 2019, vol. 121, pp. 562-578.

Macphee et al., Recent advances in rotor design of vertical Axis wind turbines, Wind Eng., 2012, 36 (6), pp. 647-665.

Mclaren. A Numerical and Experimental Study of Unsteady Loading of High Solidity Vertical Axis Wind Turbines, McMaster University, Ontario, Canada (2011) 273 pages.

Mohamed et al., Optimal blade shape of a modified Savonius turbine using an obstacle shielding the returning blade, Energy Convers. Manag., 52 (1) (2011), pp. 236-242.

Mohamed et al., Optimization of Savonius turbines using an obstacle shielding the returning blade, Renew. Energy, 35 (11) (2010), pp. 2618-2626.

Mohamed. Impacts of solidity and hybrid system in small wind turbines performance, Energy, 57 (2013), pp. 495-504.

Nakajima et al., Performance of double-step Savonius rotor for environmentally friendly hydraulic turbine, J. Fluid Sci. Technol., 3 (2008), pp. 410-419.

Nasab et al., Feasibility Study: Effect of Tidal Turbines Cut-in Speed for Power Generation in New Zealand, Chemical Engineering Transactions, 2021, 88, 13-18.

Neill et al., The impact of tidal stream turbines on large-scale sediment dynamics. Renewable Energy, 2009, vol. 34, pp. 2803-2812.

Nobile et al., Unsteady flow simulation of a vertical axis augmented wind turbine: a two-dimensional study, J. Wind Eng. Ind. Aerod., 125 (2014), pp. 168-179.

Orourke et al., Tidal energy update 2009. Applied Energy, 2010, vol. 87, pp. 398-409.

Orrell et al., "2014 Distributed Wind Market Report," U.S. Department of Energy, Richland, Washington, 2015. 46 pages.

Paraschivoiu et al., H-darrieus wind turbine with blade pitch control, Int. J. Rotating Mach., 2009 , pp. 1-7.

Paraschivoiu. Wind Turbine Design: With Emphasis on Darrieus Concept, Presses inter Polytechnique, 2002. TOC only. 8 pages.

Ponta et al., On the aerodynamics of variable-geometry oval-trajectory Darrieus wind turbines, Renew. Energy, 32 (1) (2007), pp. 35-56.

Preen et al., Toward the coevolution of novel vertical-Axis wind turbines, Trans. Evol. Comput., 19 (2) (2015), pp. 284-294.

Pyper. Large Corporations are Driving America's Renewable Energy Boom. Greentech Media, 2017. 12 pages.

Ragheb. Vertical Axis Wind Turbines, University of Illinois at Urbana-Champaigh, Urbana-Champaign, Illinois (2008). 40 pages.

Rezaeiha et al., Towards optimal aerodynamic design of vertical axis wind turbines: Impact of solidity and No. of blades. Energy, 2018, vol. 165, pp. 1129-1148.

Singh et al., Investigation of self-starting and high rotor solidity on the performance of a three S1210 blade H-type Darrieus rotor, Renew. Energy, 76 (2015), pp. 381-387.

Sorensen et al., Drag prediction for blades at high angle of attack using CFD, J. Sol. Energy Eng., 126 (4) (2004), pp. 1011-1016.

Sutherland et al., A retrospective of VAWT technology, Sandia National Laboratories, Albuquerque, New Mexico and Livermore, California (2012). 64 pages.

Travin et al., Physical and numerical upgrades in the detached-eddy simulation of complex turbulent flows, Advances in LES of Complex Flows, Springer, Dordrecht (2002), pp. 239-254.

Trivellato et al., On the Courant-Friedrichs-Lewy criterion of rotating grids in 2D vertical-axis wind turbine analysis, Renew. Energy, 62 (2014), pp. 53-62.

U.S. Department of Energy; Energy Efficiency and Renewable Energy; "20% Wind Energy by 2030, Increasing Wind Energy's Contribution to U.S. Electricity Supply," 2008. 248 pages.

Uihlein et al., Wave and tidal current energy—A review of the current state of research beyond technology. Renewable and Sustainable Energy Reviews, 2016, vol. 58, pp. 1070-1081.

US Energy Inforamtion Administation, "Renewable energy explained," US Energy Inforamtion Administation, 2019. 3 pages.

Wakui et al., Hybrid configuration of Darrieus and Savonius rotors for stand-alone wind turbine-generator systems, Electr. Eng. Jpn., 150 (4) (2005), pp. 259-266.

Wang et al., Numerical investigation on aerodynamic performance of a novel vertical axis wind turbine with adaptive blades, Energy Convers. Manag., 108 (2016), pp. 275-286.

Wekesa et al., A numerical analysis of unsteady inflow wind for site specific vertical axis wind turbine: a case study for Marsabit and Garissa in Kenya, Renew. Energy, 76 (2015), pp. 648-661.

Wekesa et al., Experimental and numerical study of turbulence effect on aerodynamic performance of a small-scale vertical axis wind turbine, J. Wind Eng. Ind. Aerod., 157 (2016), pp. 1-14.

Wekesa et al., Influence of operating conditions on unsteady wind performance of vertical axis wind turbines operating within a fluctuating free-stream: a numerical study, J. Wind Eng. Ind. Aerod., 135 (2014), pp. 76-89.

Wiser et al., 2014 Wind Technologies Market Report. U.S. Department of Energy, Berkeley, California, 2015. 93 pages.

Office Action for Canadian Patent Application No. 3,236,218 dated Sep. 25, 2025 (13 pages).

* cited by examiner

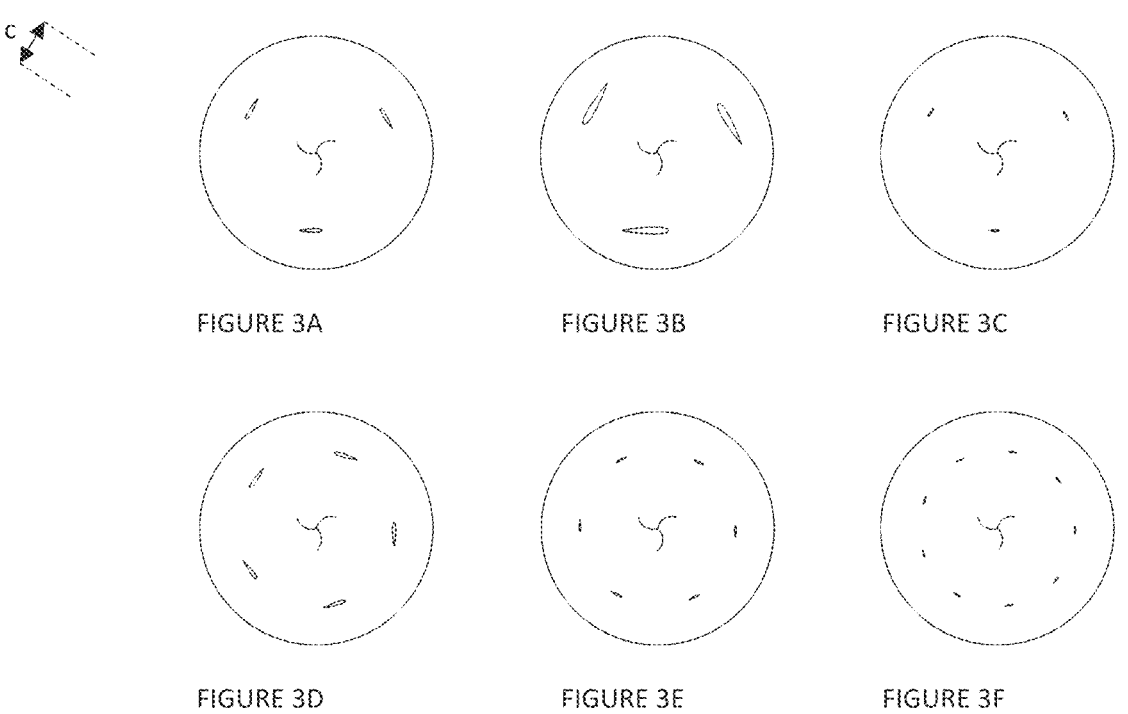
FIGURE 3A          FIGURE 3B          FIGURE 3C
FIGURE 3D          FIGURE 3E          FIGURE 3F
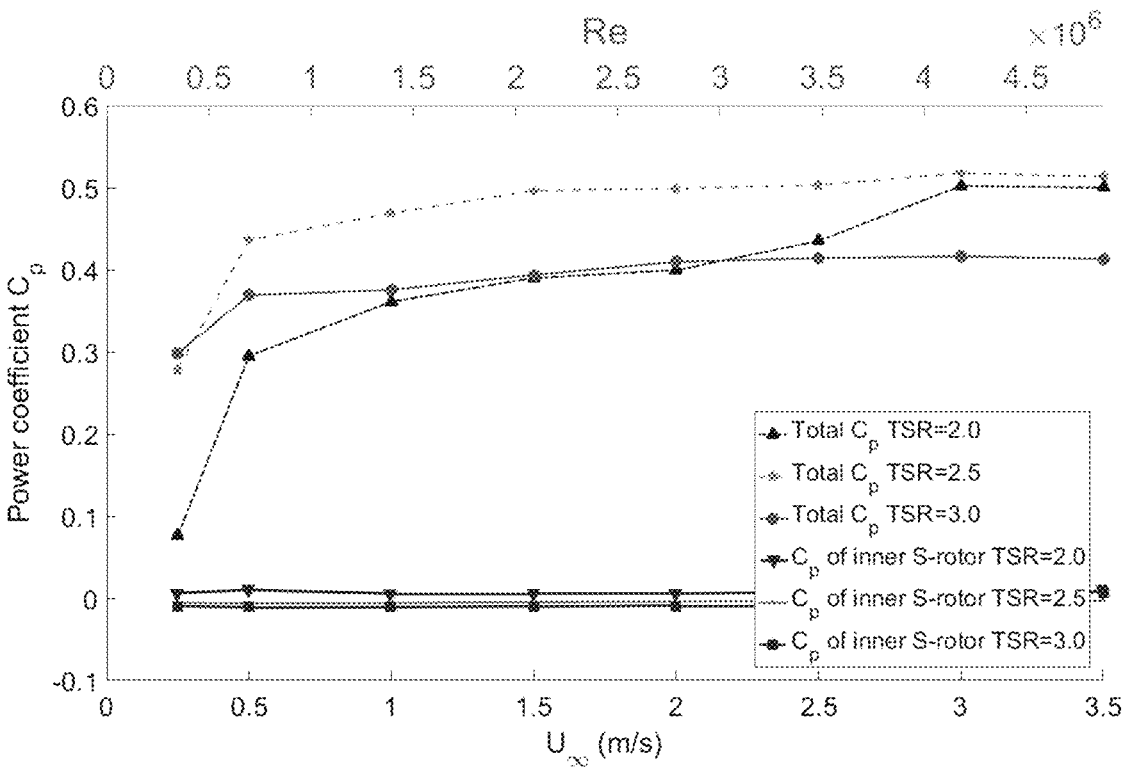
FIGURE 4

Normalized Z vorticity field when
U_inf = 0.25 m/s and TSR = 2.0

Normalized Z vorticity field when
U_inf = 0.25 m/s and TSR = 3.0

Normalized Z vorticity of D=0.7 m
U_inf = 2.5 m/s and TSR = 2.5

Normalized Z vorticity of D=14 m
U_inf = 2.5 m/s and TSR = 2.5

Normalized Z vorticity of HDMS VAWT with half solidity

Normalized Z vorticity of HDMS VAWT with 5/3 solidity

Normalized Z vorticity when D=14 m, U_inf=2.5 m/s
and TSR=2.5 for 6-blade design Normalized Z vorticity when D=14 m, U_inf=2.5 m/s
and TSR=2.5 for 9-blade design Strong wind/wave

FLOATING HYBRID DARRIEUS-SAVONIUS TIDAL/WAVE/WIND HARVESTING SYSTEM

CROSS REFERENCE TO RELATED APPLICATIONS

This application is a continuation application claiming priority to International Patent Application No. PCT/US2022/078680 filed on 26 Oct. 2022, which claims priority to U.S. Provisional Patent Application No. 63/271,733 filed on Oct. 26, 2021 in the name of Meilin YU and entitled "EnergyMaster—a Floating Hybrid Tidal/Wave/Wind Harvesting System," both of which are hereby incorporated by reference herein in their entirety.

FIELD

The present invention relates to a floatable system and method of simultaneously, and efficiently, collecting wind energy and tidal/wave energy and converting both to mechanical energy.

BACKGROUND

Although the global deployment of renewable energy has been rapidly expanding, the overall impacts of renewable energy on energy security and economic growth are generally much lower than desired [1]. To achieve the ambitious renewable energy goals set by the United States, and the world, the present inventors have been investigating vertical-axis turbines (VATs) for wind and tidal/wave energy harvesting, two major contributors to renewable energy production. Several major bottlenecks in current wind and tidal/wave energy harvesting technologies exist, including high cut-in speed and low power efficiency [2, 3]. Further, there exist several technical barriers in current VAT designs, including poor self-starting capability [4], relatively low power harvesting efficiency when not correctly designed [5], and structural resonance and fatigue under complex fluid loads [6], which impede continuous and efficient energy manufacturing.

Modern horizontal axis wind turbines (HAWTs) can achieve peak efficiencies of 75% to 80% of the Betz limit, but are generally not suited for distributed uses such as agriculture and rural residential areas because of high manufacturing costs, installation, operation and maintenance costs, high noise emission, and detrimental effects on birds and insects [7]. For distributed wind energy in rural areas (e.g., Maryland, U.S.A., Eastern Shore), distributed wind systems can range from a less than 1-kW off-grid wind turbine to a 50-kW wind turbine in a small farm [8]. Due to low sensitivity to wind directions and other atmospheric conditions, vertical-axis wind turbines (VAWTs) are new solutions for distributed wind energy applications. The commercialization potential for tidal energy is larger than that for other ocean energy since it can be almost perfectly forecasted and is hardly influenced by weather conditions [9]. However, state-of-the-art tidal energy devices (TEDs) can only harness tidal energy with high current speeds (>2.25 m/s) [10, 11]. Only 2% of the United States sea regions can apply existing TEDs, in the states of Maine and Alaska [9]. There are vast, but untapped, tidal energy resources with lower tidal current speeds (1.0~1.5 m/s) along the U.S. continental shelf edge. If a high-efficiency TED for low tidal current speeds is commercially available, more than 70% of the U.S. sea regions could be used for tidal energy generation [12].

In the present disclosure, the present inventors introduce a floatable hybrid tidal/wave/wind energy harvesting system, based on vertical axis turbines, which can simultaneously harvest wind energy and tidal/wave energy. Advantageously, the floatable harvesting system described herein can continuously harvest wind and tidal/wave energy in a wide range of wind and tidal current speeds, while providing excellent self-starting capability and structural stability.

SUMMARY

In one aspect, a floatable hybrid tidal/wave/wind energy harvesting system is described, said system comprising:
(i) a first hybrid Darrieus-Modified-Savonius (HDMS) vertical axis turbine (VAT);
(ii) a second HDMS VAT; and
(iii) a floatable foundation, wherein the floatable foundation comprises a first side and a second side such that when the floatable foundation is in/on a body of water, the first side and second side are above and below a surface of the water, respectively,
wherein the first HDMS VAT and the second HDMS VAT are positioned on the first side and the second side of the floatable foundation, respectively, and wherein the first HDMS VAT and second HDMS VAT are the same as or different from one another.

In another aspect, a method of using a floatable hybrid tidal/wave/wind energy harvesting system to convert kinetic energy to mechanical energy, said method comprising.
(i) converting kinetic wind energy to mechanical energy using a first hybrid Darrieus-Modified-Savonius (HDMS) vertical axis turbine (VAT); and
(ii) converting kinetic wave/tidal energy of a body of water to mechanical energy using a second HDMS VAT,
wherein the first and second HDMS VATs are both positioned on a floatable foundation to collect and convert kinetic energy from wind and waves/tides to mechanical energy simultaneously, wherein the first HDMS VAT and second HDMS VAT are the same as or different from one another.

Other aspects, features and embodiments of the invention will be more fully apparent from the ensuing disclosure and appended claims.

BRIEF DESCRIPTION OF THE FIGURES

FIG. 3A. Geometric profile of the original design of the HDMS VAT.

FIG. 3B. Geometric profile of three-bladed design with double solidity.

FIG. 3C. Geometric profile of three-bladed design with half solidity.

FIG. 3D. Geometric profile of five-bladed design with 5/3 solidity.

FIG. 3E. Geometric profile of six-bladed design with the same solidity as FIG. 3A.

FIG. 3F. Geometric profile of nine-bladed design with the same solidity as FIG. 3A.

FIG. 4. Relationship between the power coefficient of the original design of the HDMS turbine (D=1.4 m) and various freestream velocities $U_\infty$ and TSRs.

DETAILED DESCRIPTION, AND PREFERRED EMBODIMENTS THEREOF

Figures 1A, 1B:
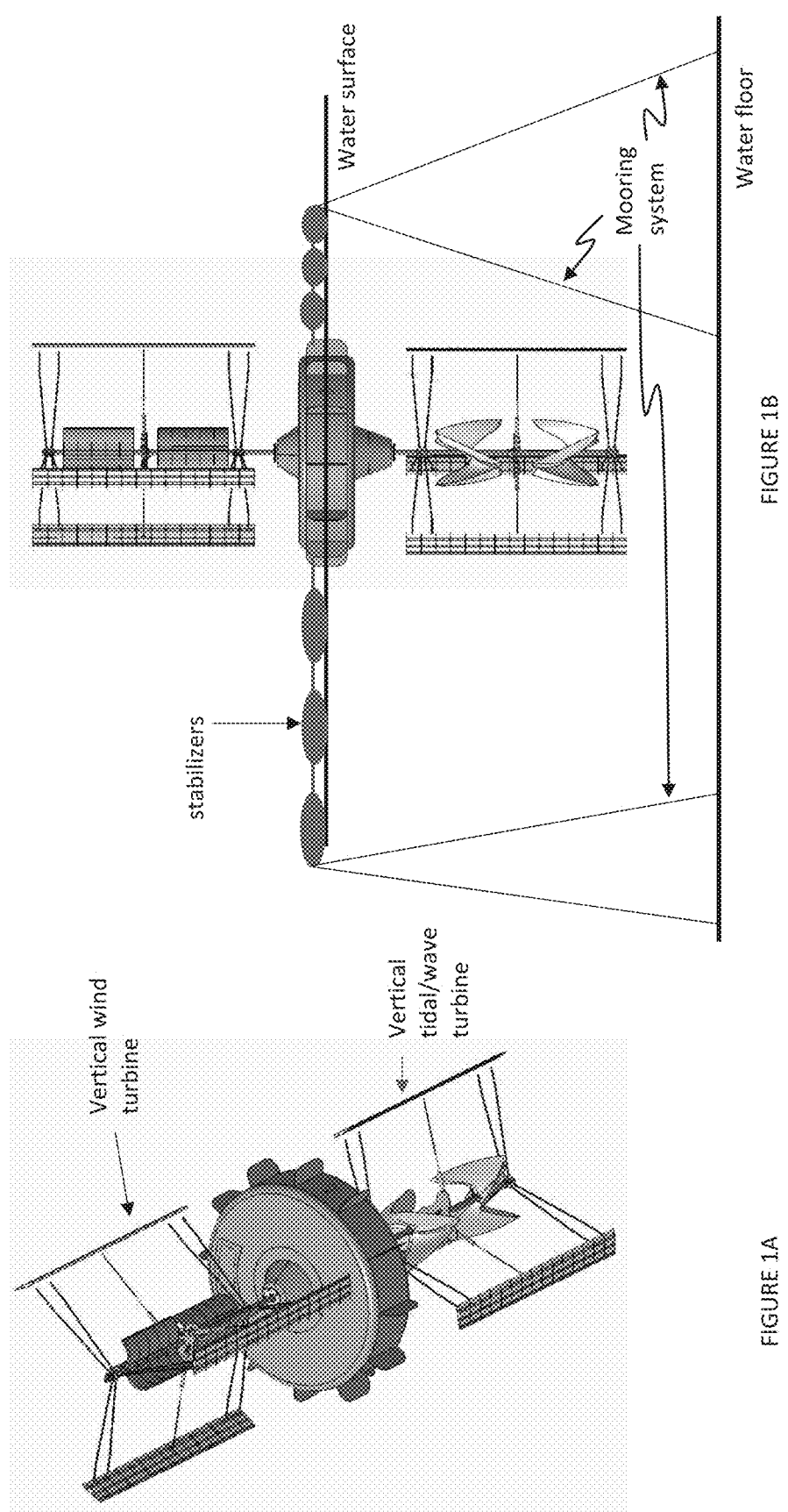
FIG. 1A. A perspective view of an embodiment of the EnergyMaster floating hybrid tidal/wave/wind energy harvesting system.
FIG. 1B. A side view of an embodiment of the EnergyMaster floating hybrid tidal/wave/wind energy harvesting system, showing the floatable foundation floating in a body of water, with an embodiment of the WindMaster above the surface of the water and an embodiment of the TideMaster below the surface of the water.

Although the claimed subject matter will be described in terms of certain embodiments, other embodiments, including embodiments that do not provide all of the benefits and features set forth herein, are within the scope of this disclosure as well. Various structural and parameter changes may be made without departing from the scope of this disclosure.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents, and other references mentioned herein are incorporated by reference in their entirety. The materials, methods, and examples disclosed herein are illustrative only and not intended to be limiting.

"About" and "approximately" are used to provide flexibility to a numerical range endpoint by providing that a given value may be "slightly above" or "slightly below" the endpoint without affecting the desired result, for example, +/-5%.

The phrase "in one embodiment" or "in some embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As defined herein, a "body of water" includes, but is not limited to, a bay, a bayou, a canal, a channel, a cove, a creek, a delta, an estuary, a fjord, a gulf, a harbor, an inlet, a lake, a mill pond, an ocean, a pond, a reservoir, a river, a sea, a sound, a strait, a stream, and a tide.

As defined herein, the "self-starting" capability of a VAT is defined as that the wind turbine can reach the desirable TSRs under nominal wind conditions without external load. As a result, the turbines can effectively harvest wind energy when appropriate energy collectors (in the form of external load) are activated.

As defined herein, the "tip speed ratio" or "TSR" is defined as the ratio between the rotating speed at the tip of the rotor and the incoming wind speed.

As defined herein, "semi-circular" means having the shape of half of a circle around an axis and can include a true semicircle but also a minor arc of a circle, which is defined as the shorter arc connecting two endpoints on a circle, wherein the measure of the minor arc is less than 180° (i.e., equal to the central angle).

As defined herein, a "blockage ratio" is the ratio of turbine frontal area relative to the cross-sectional area of the surrounding body of water flow passage, e.g., a channel.

Broadly, EnergyMaster is a floating hybrid tidal/wave/wind energy harvesting system using vertical axis wind/water turbines (VAWTs) for synergized tidal, wave and wind energy production. The EnergyMaster system converts kinetic energy of fluids (wind and water) into mechanical energy via fluid-structure interaction, and comprises a Wind-Master for wind energy harvesting and a TideMaster for tidal energy harvesting. The aerodynamic design of WindMaster is similar to the hydrodynamic design of TideMaster due to comparable aero-hydro features. EnergyMaster can be easily scaled in size without changing the design, and has excellent self-starting capability. An illustration of EnergyMaster is presented in FIGS. 1A and 1B.

The EnergyMaster's vertical axis turbine (VAT) component (i.e., the WindMaster) can effectively harvest wind energy in a wide range of wind speeds (e.g., from about 5 m/s to about 25 m/s) with high energy harvesting efficiency comparable with that of modern HAWTs, and its water turbine component (i.e., the TideMaster) can effectively harvest hydrokinetic energy in a wide range of water speeds (e.g., from about 0.5 m/s to about 3 m/s) with high energy harvesting efficiency comparable with that of modern tidal energy devices (TEDs). In some embodiments, the energy harvesting efficiency at wind speeds in a range from about 5 m/s and about 10 m/s, can be as great as about 60%, about 65%, about 70%, about 75%, or about 80% of the Betz limit. In some embodiments, the energy harvesting efficiency at tidal current speeds of about 1 m/s to about 3 m/s, can be as great as about 65%, about 70%, about 75%, about 80%, or about 87% of the Betz limit. Advantageously, compared to horizontal axis turbines, VATs are (i) omnidirectional, so that an expensive yaw control mechanism is not needed, (ii) easier to install and maintain, and (iii) have low environmental impact, e.g., they are less harmful to birds, insects, fish, and marine mammals, and have less noise emission. These features make VATs attractive for distributed renewable energy applications in agricultural and aquacultural sectors. Because offshore wind resources are much better than those onshore (e.g., the average offshore wind speed can be up to 8.5 m/s), the performance of the wind turbine part of EnergyMaster can be substantially improved. Meanwhile, the highly efficient water turbine part can be utilized to harvest energy from low-speed (e.g., 0.5~1 m/s) tidal currents, expanding the application potential of tidal energy generation to over 70% of the U.S sea regions.

The basic principles of tidal and wind energy harvesting with vertical axis turbines (VATs) share the same general mechanism: convert kinetic energy of fluids into mechanical energy via fluid-structure interaction. The energy conversion efficiency has a theoretical upper limit, i.e., the Betz limit (59.3%). This says that at most 59.3% of the fluid kinetic energy (defined as $(\rho A V^3)/2$, where $\rho$ is the fluid density, A is the frontal area of the turbine, and V is the fluid velocity) can be extracted from unconfined fluid flows. An interesting observation is that (1) the energy density, $\rho V3$, in air and water can be very similar. For example, the air's density is three orders of magnitude smaller than that of water, but the wind speed is usually one order of magnitude larger than that of tide current. Therefore, $\rho V3$ is almost the same in air and water. Furthermore, the kinematic viscosity of air ($v_{air}$=1.516×10$^{-5}$ m²/s at 20° C.) is one order of magnitude larger than that of water ($v_{water}$=1.004×10$^{-6}$ m²/s at 20° C.). Therefore, (2) the Reynolds number (defined as Re=VL/v, where L is a characteristic length) of the flow over a wind turbine is almost the same as that of a water turbine of the same size. The two facts (1) and (2) indicate that the aerodynamic design of vertical-axis wind turbines can be similar to the hydrodynamic design of vertical-axis tidal turbines. This is the theoretical foundation that supports the design of EnergyMaster.

Broadly, in a first aspect, a floatable hybrid tidal/wave/wind energy harvesting system (i.e., the EnergyMaster) is described, said system comprising:

(i) a first vertical axis turbine (VAT) (i.e., a WindMaster);

(ii) a second VAT (i.e., a TideMaster); and (iii) a floatable foundation, wherein the floatable foundation comprises a first side and a second side such that when the floatable foundation is in/on a body of water, the first side and second side are above and below a surface of the water, respectively, wherein the first VAT and the second VAT are positioned on the first side and the second side of the floatable foundation, respectively, wherein the first VAT and second VAT are the same as or different from one another, and wherein at least one of the two VATs is a hybrid Darrieus-Modified-Savonius (HDMS) VAT. For example, in some embodiments, the first VAT is an HDMS VAT and the second VAT comprises a Darrieus turbine. In some embodiments, the second VAT is an HDMS VAT and the first VAT comprises a Darrieus turbine.

In some embodiments of the first aspect, the floatable hybrid tidal/wave/wind energy harvesting system (i.e., the EnergyMaster) comprises:

(i) a first hybrid Darrieus-Modified-Savonius (HDMS) vertical axis turbine (VAT) (i.e., a WindMaster);

(ii) a second HDMS VAT (i.e., a TideMaster); and (iii) a floatable foundation, wherein the floatable foundation comprises a first side and a second side such that when the floatable foundation is in/on a body of water, the first side and second side are above and below a surface of the water, respectively, wherein the first HDMS VAT and the second HDMS VAT are positioned on the first side and the second side of the floatable foundation, respectively, and wherein first HDMS VAT and second HDMS VAT are the same as or different from one another.

In some embodiments of the first aspect, at least one turbine part of the EnergyMaster technology is a multi-stage hybrid Darrieus-Modified-Savonius (HDMS) vertical axis turbine developed to harvest tidal/wave/wind energy efficiently under a wide range of flow conditions, while also providing good self-starting properties and enhanced structural stability [13]. In some embodiments of the first aspect, the first HDMS VAT comprises a combination of a Savonius (i.e., drag-driven) turbine in a central region about a common axis and a Darrieus (i.e., lift-driven) turbine in the annular region surrounding the Savonius turbine in the central region. In some embodiments of the first aspect, the second HDMS VAT comprises a combination of a Savonius (i.e., drag-driven) turbine in a central region about a common axis and a Darrieus (i.e., lift-driven) turbine in the annular region surrounding the Savonius turbine in the central region. In some embodiments of the first aspect, first HDMS VAT comprises a Modified Savonius (MS) rotor centrally located about a common axis relative to a straight-bladed H-type Darrieus rotor to simultaneously enhance the self-starting capability, using the MS rotor, and maintain high energy harvesting efficiency, using the Darrieus rotor. In some embodiments of the first aspect, the second HDMS VAT comprises a Modified Savonius (MS) rotor centrally located about a common axis relative to a straight-bladed H-type Darrieus rotor to simultaneously enhance the self-starting capability, using the MS rotor, and maintain high energy harvesting efficiency, using the Darrieus rotor.

Accordingly, in some embodiments of the first aspect, a floatable hybrid tidal/wave/wind energy harvesting system is described, said system comprising:

(i) a first hybrid Darrieus-Modified-Savonius (HDMS) vertical axis turbine (VAT), wherein the first HDMS VAT comprises a combination of a Modified Savonius (MS) turbine in a central region about a common axis and a Darrieus turbine in the annular region surrounding the MS turbine in the central region;

(ii) a second HDMS VAT, wherein the second HDMS VAT comprises a combination of a Modified Savonius (MS) turbine in a central region about a common axis and a Darrieus turbine in the annular region surrounding the MS turbine in the central region; and (iii) a floatable foundation, wherein the floatable foundation comprises a first side and a second side such that when the floatable foundation is in/on a body of water, the first side and second side are above and below a surface of the water, respectively, wherein the first HDMS VAT and the second HDMS VAT are positioned on the first side and the second side of the floatable foundation, respectively, and wherein the first HDMS VAT and second HDMS VAT are the same as or different from one another.

Advantageously, if the EnergyMaster system is mounted in shallow water, where the blockage ratio is large, e.g., 0.1~0.2, its energy harvesting efficiency can exceed the Betz limit due to the free surface effect. A theoretical analysis with inviscid flow and actuator disk assumptions indicates that the peak power coefficient can increase from 60% (almost 100% of the Betz limit) to 93% as the blockage ratio increases from 0.05 to 0.2. Considering the viscous effects and turbine tip loss in practical fluid flows, the real peak power coefficient will be lower than the theoretical prediction, but can still exceed the Betz limit. This special mechanism makes EnergyMaster an attractive technology for shallow-water tidal energy harvesting.

Additional advantages of the EnergyMaster system described herein include, but are not limited to, suitability in deeper waters (e.g., the West Coast and Gulf of Maine in the U.S.) where fixed foundation technology cannot be used, an increase in the energy density of the floating platform because both the WindMaster and TideMaster harvesting devices share the same platform, which can decrease the cost of offshore renewable energy.

In a second aspect, a method of using a floatable hybrid tidal/wave/wind energy harvesting system (i.e., the Energy-Master) to convert the kinetic energy to mechanical energy is described, said method comprising.

(i) converting kinetic wind energy to mechanical energy using a first vertical axis turbine (VAT) (i.e., a WindMaster); and (ii) converting kinetic wave/tidal energy of a body of water to mechanical energy using a second VAT (i.e., a TideMaster), wherein the first and second VATs are both positioned on a floatable foundation to collect and convert kinetic energy from wind and waves/tides to mechanical energy simultaneously, wherein the first VAT and second VAT are the same as or different from one another, and wherein at least one of the two VATs is a hybrid Darrieus-Modified-Savonius (HDMS) VAT. In some embodiments, the first VAT, the second VAT, or both, are described herein in the first aspect.

In some embodiments of the second aspect, a method of using a floatable hybrid tidal/wave/wind energy harvesting system (i.e., the EnergyMaster) to convert the kinetic energy to mechanical energy is described, said method comprising.

(i) converting kinetic wind energy to mechanical energy using a first hybrid Darrieus-Modified-Savonius (HDMS) vertical axis turbine (VAT) (i.e., a WindMaster); and (ii) converting kinetic wave/tidal energy of a body of water to mechanical energy using a second HDMS VAT (i.e., a TideMaster), wherein the first and second HDMS VATs are both positioned on a floatable foundation to collect and convert kinetic energy from wind and waves/tides to mechanical energy simultaneously, wherein the first HDMS VAT and second HDMS VAT are the same as or different from one another. In some embodiments, the first HDMS VAT, the second HDMS VAT, or both, are described herein in the first aspect.

The First HDMS VAT, i.e., the WindMaster

In some embodiments, the first HDMS VAT is described in U.S. Pat. No. 11,303,348 in the name of Meilin Yu et al., which is incorporated by reference herein in its entirety. The hybrid design described in U.S. Pat. No. 11,303,348 circumvents the weaknesses of individual Darrieus or Savonius designs by engineering nonlinear dynamic interaction between the two. In some embodiments, the first HDMS VAT comprises a Modified Savonius (MS) rotor centrally located relative to a straight-bladed H-type Darrieus rotor to simultaneously enhance the self-starting capability, using the MS rotor, and maintain high energy harvesting efficiency, using the Darrieus rotor.

With regards to the MS rotor in the central region, said MS rotor comprises a plurality of blade-sets or stages, stacked upon one another and rotatable about a common, central axis. The common axis is transverse to the flow of the fluid medium. Each blade-set or stage comprises a plurality of rectangular blades or sails, each of which is substantially the same size, extending from the common axis to its terminate. For example, the blade-set can comprise two, three, four, or more blades or sails. In some embodiments, the blade-set comprises three blades or sails arranged approximately 120-degree angles from each other around the common axis (see, for example, FIG. 1C which shows a top-view of the blades of a HDMS VAT, labeled "MS"). Each rectangular blade has a blade length and a blade height. Each blade in the blade-set is curved or arced along the blade length such that each blade has a semi-circular shape, an elliptical shape, or a twisted shape that allows fluid to push on the concave side of each blade, and pull on the convex side of each blade.

In some embodiments, each blade-set or stage is rotated relative to the next blade-set or stage along the central axis such that the second blade set is not aligned with that of the first. For example, in some embodiments, the second blade-set is rotated approximately 20-60 degrees from the first, and if present, the third is still another approximately 20-60 degrees behind the second or approximately 40-120 degrees behind the first. It should be appreciated by the person skilled in the art that the MS rotor of the apparatus can comprise one, two, three, four, five, or more blade-sets, and that each blade-set can have substantially the same, or different, height and/or diameter relative to another blade-set. Further, each blade-set can comprise the same number, or a different number, of blades as the other blade-sets making up the MS rotor portion of the HDMS VAT. The MS rotor in the central region can be built in either clockwise or anti-clockwise parities. In a preferred embodiment, the common axis comprises a shaft. The shaft can be static, with the overall blade-set assembly mounted upon and rotating about the non-rotating shaft on bearings or bushings. Alternatively, the shaft can be rotatable, wherein the blade-set assembly is attached to the rotatable shaft, and the rotating shaft rotates about the central axis, as understood by the person skilled in the art. The MS rotor can comprise a brake system, for example a hydraulic brake system, that is mounted upon the shaft with bearings to limit the rotational speed of the rotor assembly to a maximum speed at high wind/fluid speeds, as readily determined by the person skilled in the art.

In some embodiments, the concave or semi-circular portions of the MS blades are "capped" off at at least one end. It should be appreciated that there can be one or two caps associated with the ends of the semi-circular portions of the blades of a blade-set, meaning that only the top of the blades are capped, only the bottom of the blades are capped, or both the top and the bottom of the blades are capped, depending on the achievement of the greatest harvesting efficiency. In some embodiments, the concave or semi-circular portions of the MS blades are not capped at all. In some embodiments, the MS rotor further comprises at least one circular plate positioned at the top, the bottom, or both the top and bottom of the MS blades, wherein each plate is substantially perpendicular to the common axis. In this circular plate embodiment, the blade height of the MS blades is equal to the distance between first and second circular plates, when both are present. Each blade in the blade-set is attached along the blade length to the first and second circular plates from the common axis to a position proximate to an edge of the circular plates. It should be appreciated that an edge of each blade may be aligned with an edge of the circular plates, or an edge of each blade may be inset a nominal distance from the edge of the circular plates.

With regards to the Darrieus rotor in the surrounding annular region, in some embodiments, the Darrieus rotor is a straight bladed H-type Darrieus rotor, although it should be appreciated that a helical-type or the traditional semicircular-type Darrieus rotor is contemplated for use in the HDMS VAT disclosed herein. The straight-bladed H-type Darrieus rotor comprises a plurality of blades that can rotate about the common axis (see, for example, FIG. 1C which shows a top-view of the blades of a HDMS VAT, labeled "D"). In some embodiments, the cross-section of the blade is of a substantially symmetrical airfoil shape, although non-symmetrical airfoil blade shapes can be used. For example, a NACA 0015 airfoil blade design has generally a wide, round leading edge and a squat parabolic length in cross-section and is defined in part by a chord length, c. It should be appreciated that the shape of the airfoil blades can be adjusted as needed depending on the given wind power generation requirements, as readily understood by the person skilled in the art. In some embodiments, the plurality of blades is rigidly held in a position substantially parallel to the common axis. In some embodiments, each blade is attached to the blade-sets of the MS rotor using a plurality of supporting struts. In some embodiments, each blade is attached to the shaft of the central axis using a plurality of supporting struts. In In some embodiments, each blade is attached to the blade-sets of the MS rotor using a plurality of supporting struts. In some embodiments, each blade is preferably positioned substantially equiangular around the common axis. The Darrieus rotor of the HDMS VAWT can comprise two, three, four, or more blades positioned around the common axis.

In some embodiments, the ratio of the radius $R_o$ of the Darrieus rotor blades relative to the radius $R_i$ of the MS rotor blades is in a range from about 1.5 to about 4, preferably about 1.5 to about 3.5, and even more preferably about 2.5 to about 3.5. In some embodiments, the ratio of the radius $R_o$ of the Darrieus rotor blades relative to the chord length, c, of the Darrieus blades is in a range from about 1.5 to about 4, preferably about 1.5 to about 3.5, and even more preferably about 2.5 to about 3.5. In some embodiments, the radius $R_i$ of the MS rotor blades is substantially the same as the chord length, c, of the Darrieus blades. In some embodiments, the radius $R_i$ of the MS rotor blades is greater than the chord length, c, of the Darrieus blades. In some embodiments, the radius $R_i$ of the MS rotor blades is less than the chord length, c, of the Darrieus blades. The preferred radius $R_i$ of the MS rotor blades relative to the chord length, c, of the Darrieus blades is dependent on when the energy harvesting efficiency is maximized, as readily determined by the person skilled in the art. In a preferred embodiment, the energy harvesting efficiency is achieved at TSR values greater than about 1.5, preferably greater than about 2.0, and most preferably greater than about 2.2.

Preferably, each HDMS VAT comprises suitable self-lubricating bushings (not shown) (e.g., bearings) to help reduce rotational friction, vibration, and noise. A suitable alternator, such as, for example, a direct drive permanent magnet alternator can be used to collect and convert the "rotational energy" power of fluid, as harnessed by the present HDMS VAT, into mechanical energy, as readily understood by the person skilled in the art. The components of the HDMS VAT comprise at least one of carbon composites, aluminum, and polymer materials, although other materials are contemplated. As defined herein, "bearings" include at least one of ball bearings, air bearings, and magnetic levitation bearings. An embodiment of how the MS rotor portion of the HDMS VAT can be found in U.S. Pat. No. 8,790,069 in the name of Bruce Elliott Anderson, which is hereby incorporated in its entirety herein.

In some embodiments, the first HDMS VAT comprises: (a) a first rotor system positioned in a central region and rotatable about a central axis, wherein the first rotor system comprises at least two blade-sets stacked vertically along the central axis, each blade-set comprising a plurality of first blades that are equiangularly spaced about the central axis, wherein the at least two blade-sets are mounted upon a shaft with bearings along the central axis, wherein each first blade extends from a position proximate to the central axis out to a position distal to the central axis and has a semi-circular shape that allows fluid to push on a concave or semi-circular side of each first blade, and (b) a second rotor system positioned in an annular region surrounding the first rotor system in the central region, wherein the second rotor system comprises a plurality of second blades equiangularly spaced about the central axis, wherein each of the second blades is positioned substantially parallel to the central axis, wherein the cross-section of the second blade is a substantially symmetrical airfoil shape. In some embodiments, each of the plurality of second blades are attached to at least one blade-set of the first rotor system using at least two supporting struts. In some embodiments, each of the plurality of second blades are attached to the shaft using at least two supporting struts.

The second HDMS VAT, i.e., the TideMaster

In some embodiments, the second HDMS VAT is described in U.S. Pat. No. 11,303,348 in the name of Meilin Yu et al., which is incorporated by reference herein in its entirety. The hybrid design described in U.S. Pat. No. 11,303,348 circumvents the weaknesses of individual Darrieus or Savonius designs by engineering nonlinear dynamic interaction between the two. In some embodiments, the second HDMS VAT comprises a Modified Savonius (MS) rotor centrally located relative to a straight-bladed H-type Darrieus rotor to simultaneously enhance the self-starting capability, using the MS rotor, and maintain high energy harvesting efficiency, using the Darrieus rotor.

In some embodiments, with regards to the MS rotor in the central region, said MS rotor comprises a plurality of blade-sets or stages, stacked upon one another and rotatable about a common, central axis. The common axis is transverse to the flow of the fluid medium. Each blade-set or stage comprises a plurality of rectangular blades or sails, each of which is substantially the same size, extending from the common axis. For example, the blade-set can comprise two, three, four, or more blades or sails. In some embodiments, the blade-set comprises three blades or sails arranged approximately 120-degree angles from each other around the common axis (see, for example, FIG. 1C which shows a top-view of the blades of a HDMS VAT, labeled "MS"). Each rectangular blade has a blade length and a blade height. Each blade in the blade-set is curved or arced along the blade length such that each blade has a semi-circular shape, an elliptical shape, or a twisted shape that allows fluid to push on the concave side of each blade, and pull on the convex side of each blade. In some embodiments, each blade-set or stage is rotated relative to the next blade-set or stage along the central axis such that the second blade set is not aligned with that of the first. For example, in some embodiments, the second blade-set is rotated approximately 20-60 degrees from the first, and if present, the third is still another approximately 20-60 degrees behind the second or approximately 40-120 degrees behind the first. It should be appreciated by the person skilled in the art that the MS rotor of the apparatus can comprise one, two, three, four, five, or more blade-sets, and that each blade-set can have substantially the same, or different, height and/or diameter relative to another blade-set. Further, each blade-set can comprise the same number, or a different number, of blades as the other blade-sets making up the MS rotor portion of the HDMS VAT. The MS rotor in the central region can be built in either clockwise or anti-clockwise parities. In a preferred embodiment, the common axis comprises a shaft. The shaft can be static, with the overall blade-set assembly mounted upon and rotating about the non-rotating shaft on bearings or bushings. Alternatively, the shaft can be rotatable, wherein the blade-set assembly is attached to the rotatable shaft, and the rotating shaft rotates about the central axis, as understood by the person skilled in the art. The MS rotor can comprise a brake system, for example a hydraulic brake system, that is mounted upon the shaft with bearings to limit the rotational speed of the rotor assembly to a maximum speed at high wind/fluid speeds, as readily determined by the person skilled in the art. In some embodiments, the concave or semi-circular portions of the MS blades are "capped" off at at least one end. It should be appreciated that there can be one or two caps associated with the ends of the semi-circular portions of the blades of a blade-set, meaning that only the top of the blades are capped, only the bottom of the blades are capped, or both the top and the bottom of the blades are capped, depending on the achievement of the greatest harvesting efficiency. In some embodiments, the concave or semi-circular portions of the MS blades are not capped at all. In some embodiments, the MS rotor further comprises at least one circular plate positioned at the top, the bottom, or both the top and bottom of the MS blades, wherein each plate is substantially perpendicular to the common axis. In this circular plate embodiment, the blade height of the MS blades is equal to the distance between first and second circular plates, when both are present. Each blade in the blade-set is attached along the blade length to the first and second circular plates from the common axis to a position proximate to an edge of the circular plates. It should be appreciated that an edge of each blade may be aligned with an edge of the circular plates, or an edge of each blade may be inset a nominal distance from the edge of the circular plates.

Figure 1C:
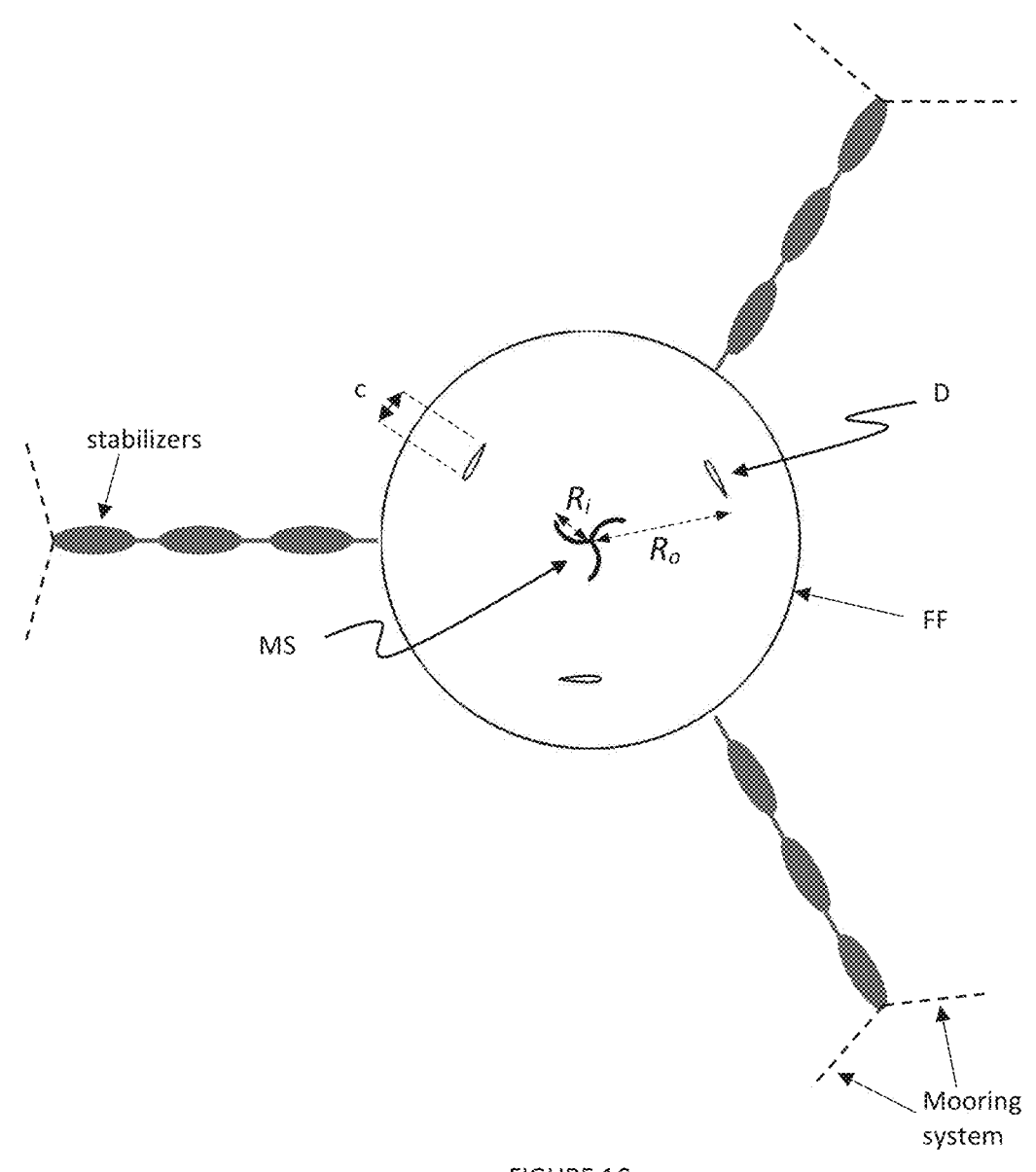
FIG. 1C. Top view of an embodiment of a WindMaster HDMS VAT, including an embodiment of stabilizers and a mooring system.
Figure 1D:
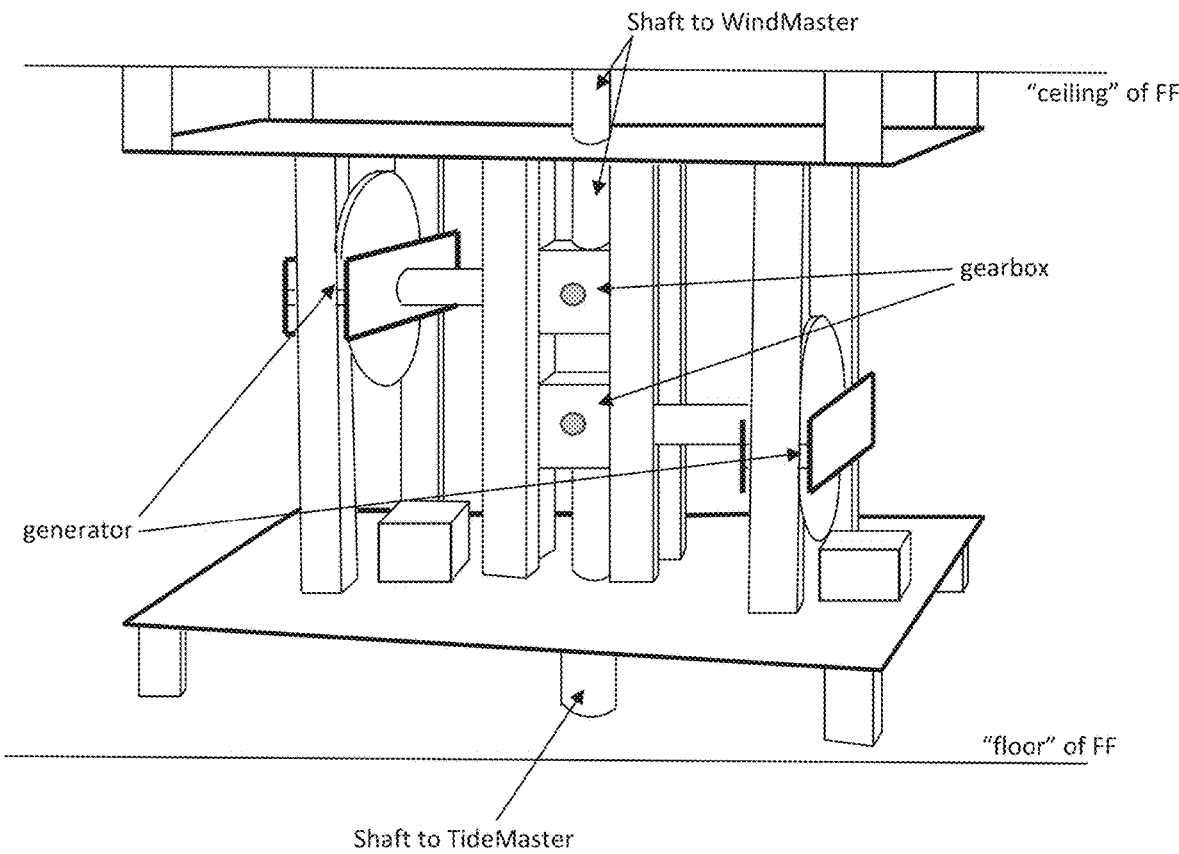
FIG. 1D. An embodiment of an inner design of the floatable foundation.
Figure 1E:
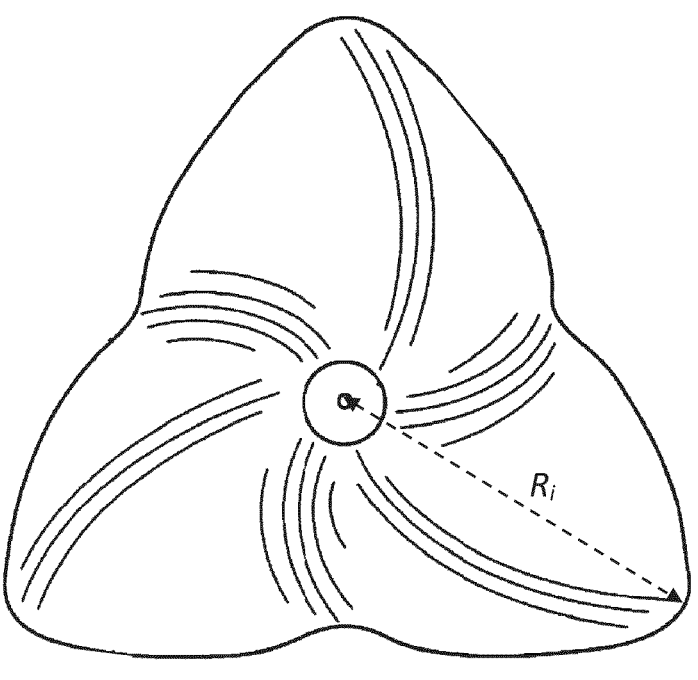
FIG. 1E. Illustrates a drawing of a bottom view of an embodiment of a helix monoblock Modified Savonius turbine.
Figure 1F:
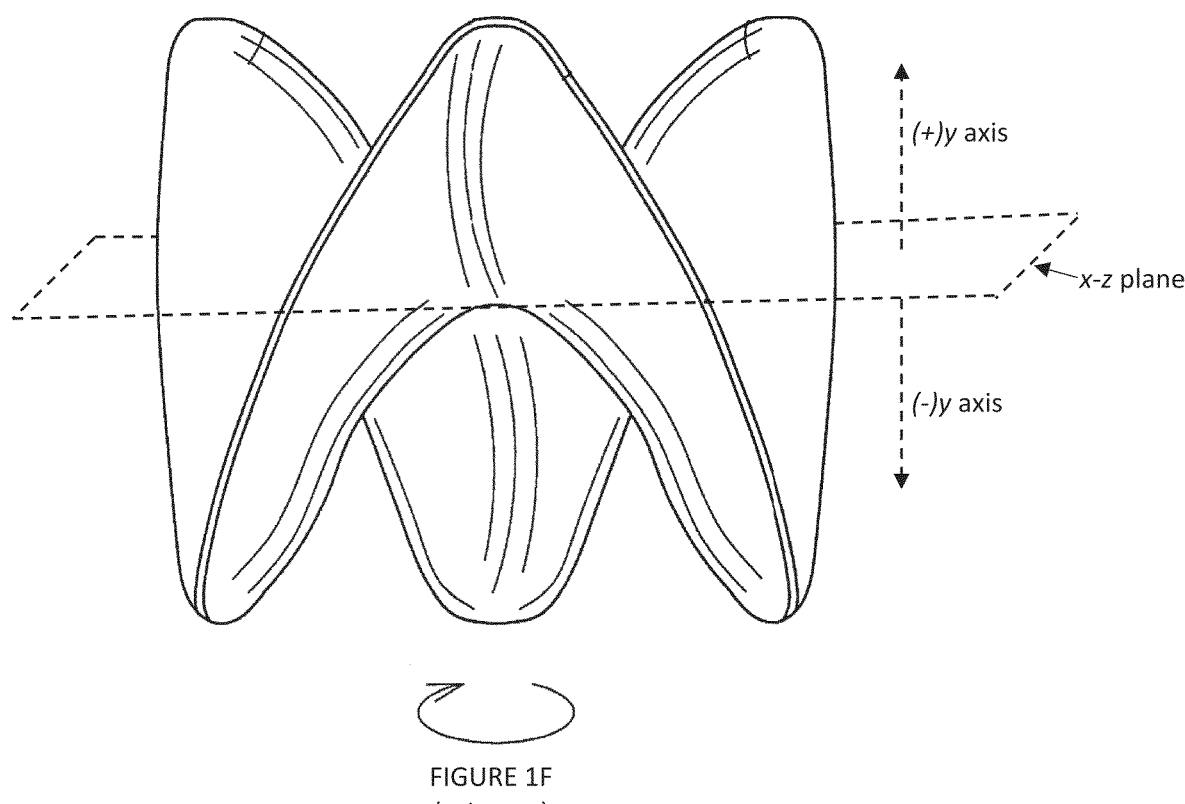
FIG. 1F. Illustrates a drawing of a side view of an embodiment of a helix monoblock Modified Savonius turbine.
Figure 2:
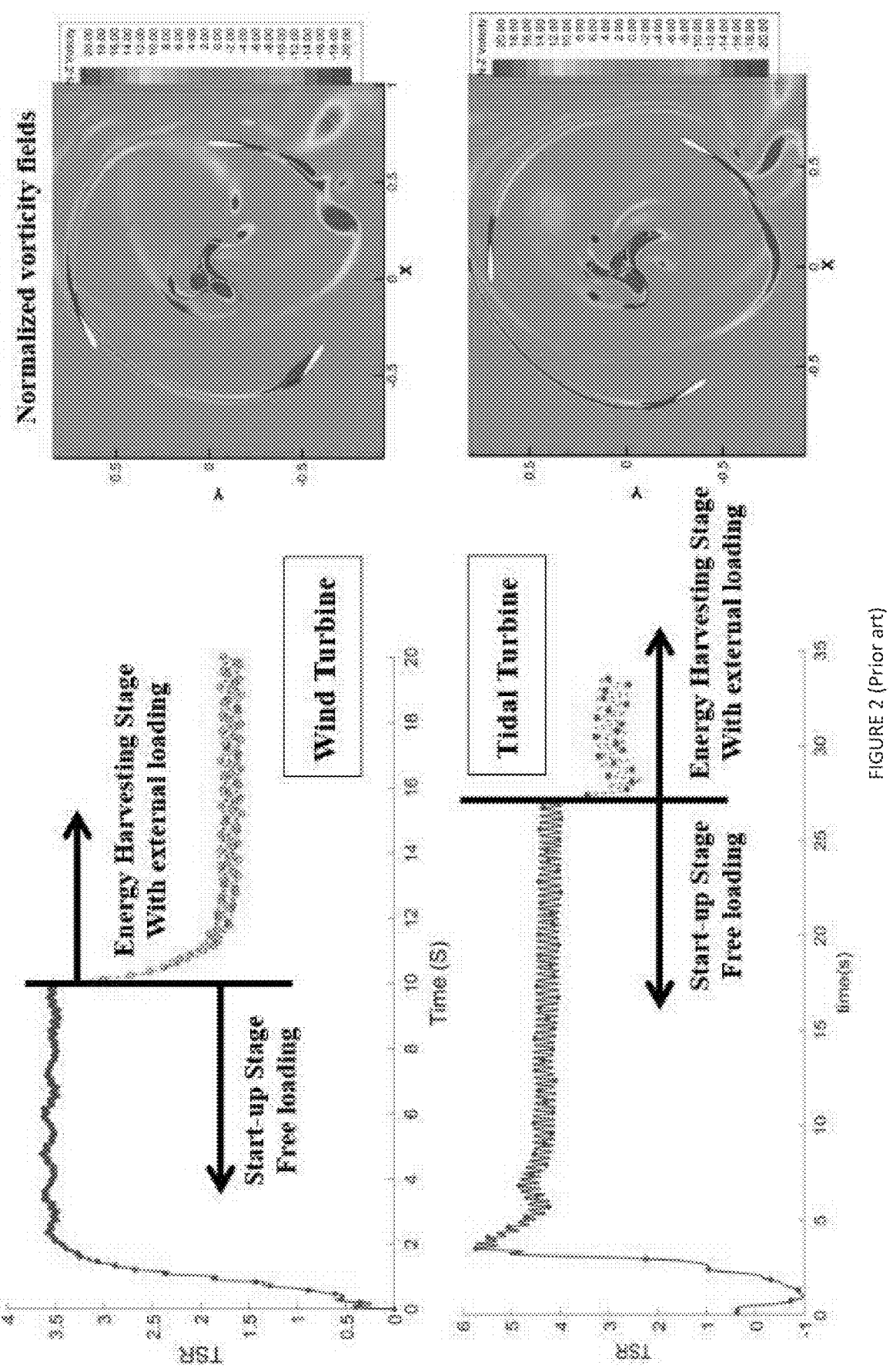
FIG. 2. Comparison of the start-up and energy harvesting performance of WindMaster (top) at 5 m/s wind and Tide-Master (bottom) at 1 m/s tidal current. m/s. On the left, the histories of the tip speed ratio (TSR) for the start-up and energy harvesting stages are presented. Note that TSR is defined as the ratio between the rotating speed at the tip of the rotor and the incoming flow speed. On the right, the normalized vorticity fields in the turbine axis direction are presented.

In some embodiments, with regards to the MS rotor in the central region, said MS rotor comprises the monolithic blade illustrated in FIGS. 1E and 1F, for example, as described in U.S. Patent Application Publication No. 20090028706 in the name of Stefan Ioana et al., which is incorporated by reference herein in its entirety. This monolithic blade, hereinafter referred to as the "Marilyn" rotor, comprises an extended geometry combining Savonius and HAWT technology into a unique shape. The monolithic Marilyn blade comprises six scoops and a hole for the shaft (see, FIG. 1E for the whole), where three scoops are positioned in the (+) y-direction and three scoops are positioned in the (−) y-direction, relative to the x-z plane running through the hole (see, FIG. 1F), wherein the scoops above and below the x-z plane are offset by about 60° relative to one another, and wherein the scoops are shaped such that fluid can push on the concave side of each scoop, thereby rotating the Marilyn rotor about a common, central axis. In some embodiments, at least one Marilyn blade is stacked upon one another and rotatable about a common, central axis (see, e.g., FIG. 1B). A common axis is transverse to the flow of the fluid medium. In some embodiments, each Marilyn blade is rotated relative to the next Marilyn blade along the central axis such that the apexes of a second Marilyn blade are not aligned with those of the first. For example, in some embodiments, the apexes of the second Marilyn blade are rotated approximately 20-60 degrees from those of the first, and if present, the third is still another approximately 20-60 degrees behind the second or approximately 40-120 degrees behind the first. It should be appreciated by the person skilled in the art that the MS rotor of the apparatus can comprise one, two, three, four, five, or more Marilyn blades, and that each Marilyn blade can have substantially the same, or different, height and/or diameter relative to another Marilyn blade. The MS rotor in the central region can be built in either clockwise or anti-clockwise parities. In a preferred embodiment, the common axis comprises a shaft. The shaft can be static, with the Marilyn blade assembly mounted upon and rotating about the non-rotating shaft on bearings or bushings. Alternatively, the shaft can be rotatable, wherein the Marilyn blade assembly is attached to the rotatable shaft, and the rotating shaft rotates about the central axis, as understood by the person skilled in the art. The MS rotor can comprise a brake system, for example a hydraulic brake system, that is mounted upon the shaft with bearings to limit the rotational speed of the rotor assembly to a maximum speed at high wind/fluid speeds, as readily determined by the person skilled in the art.

Without being bound by theory, it is believed that an advantage of the Marilyn blade is that it can stabilize the entire floating system because the Marilyn blade has 100% full solidity, which ensures capturing the fluid flow, regardless of the direction. Previous wind tunnel tests demonstrated that the Marilyn blade shows similar energy harvesting performances, regardless of its relative position with respect to the flow direction, such as vertical, horizontal, and diagonal flow. Since the wave load on the floating system will be primarily perpendicular (i.e., in the horizontal direction) and parallel (i.e., in the vertical direction) to the axis of the floating system, the Marilyn design can absorb these wave energies to stabilize the entire system. An additional advantage is that the Marilyn blade can float, which helps with the macro-stability of the EnergyMaster.

With regards to the Darrieus rotor in the surrounding annular region, in some embodiments, the Darrieus rotor is a straight bladed H-type Darrieus rotor, although it should be appreciated that a helical-type or the traditional semicircular-type Darrieus rotor is contemplated for use in the HDMS VAT disclosed herein. The straight-bladed H-type Darrieus rotor comprises a plurality of blades that can rotate about the common axis (see, for example, FIG. 1C which shows a top-view of the blades of a HDMS VAT, labeled "D"). In some embodiments, the cross-section of the blade is of a substantially symmetrical airfoil shape, although non-symmetrical airfoil blade shapes can be used. For example, a NACA 0015 airfoil blade design has generally a wide, round leading edge and a squat parabolic length in cross-section and is defined in part by a chord length, c. It should be appreciated that the shape of the airfoil blades can be adjusted as needed depending on the given wind power generation requirements, as readily understood by the person skilled in the art. In some embodiments, the plurality of blades is rigidly held in a position substantially parallel to the common axis. In some embodiments, each blade is attached to the blade-sets of the MS rotor using a plurality of supporting struts. In some embodiments, each blade is attached to the shaft of the central axis using a plurality of supporting struts. In In some embodiments, each blade is attached to the blade-sets of the MS rotor using a plurality of supporting struts. In some embodiments, each blade is preferably positioned substantially equiangular around the common axis. The Darrieus rotor of the HDMS VAWT can comprise two, three, four, or more blades positioned around the common axis.

In some embodiments, the ratio of the radius $R_o$ of the Darrieus rotor blades relative to the radius $R_i$ of the MS rotor is in a range from about 1.5 to about 4, preferably about 1.5 to about 3.5, and even more preferably about 2.5 to about 3.5. In some embodiments, the ratio of the radius $R_o$ of the Darrieus rotor blades relative to the chord length, c, of the Darrieus blades is in a range from about 1.5 to about 4, preferably about 1.5 to about 3.5, and even more preferably about 2.5 to about 3.5. In some embodiments, the radius $R_i$ of the MS rotor is substantially the same as the chord length, c, of the Darrieus blades. In some embodiments, the radius $R_i$ of the MS rotor is greater than the chord length, c, of the Darrieus blades. In some embodiments, the radius $R_i$ of the MS rotor is less than the chord length, c, of the Darrieus blades. The preferred radius $R_i$ of the MS rotor relative to the chord length, c, of the Darrieus blades is dependent on when the energy harvesting efficiency is maximized, as readily determined by the person skilled in the art. In a preferred embodiment, the energy harvesting efficiency is achieved at TSR values greater than about 1.5, preferably greater than about 2.0, and most preferably greater than about 2.2.

Preferably, each HDMS VAT comprises suitable self-lubricating bushings (not shown) (e.g., bearings) to help reduce rotational friction, vibration, and noise. A suitable alternator, such as, for example, a direct drive permanent magnet alternator can be used to collect and convert the "rotational energy" power of fluid, as harnessed by the present HDMS VAT, into mechanical energy, as readily understood by the person skilled in the art. The components of the HDMS VAT comprise at least one of carbon composites, aluminum, and polymer materials, although other materials are contemplated. As defined herein, "bearings" include at least one of ball bearings, air bearings, and magnetic levitation bearings . . .

In some embodiments, the second HDMS VAT comprises: (a) a first rotor system positioned in a central region and rotatable about a central axis, wherein the first rotor system comprises at least two blade-sets stacked vertically along the central axis, each blade-set comprising a plurality of first blades that are equiangularly spaced about the central axis, wherein the at least two blade-sets are mounted upon a shaft with bearings along the central axis, wherein each first blade extends from a position proximate to the central axis out to a position distal to the central axis and has a semi-circular shape, an elliptical shape, or a twisted shape that allows fluid to push on each first blade, and (b) a second rotor system positioned in an annular region surrounding the first rotor system in the central region, wherein the second rotor system comprises a plurality of second blades equiangularly spaced about the central axis, wherein each of the second blades is positioned substantially parallel to the central axis, wherein the cross-section of the second blade is a substantially symmetrical airfoil shape. In some embodiments, each of the plurality of second blades are attached to at least one blade-set of the first rotor system using at least two supporting struts. In some embodiments, each of the plurality of second blades are attached to the shaft using at least two supporting struts.

In some embodiments, the second HDMS VAT comprises: (a) a first rotor system positioned in a central region and rotatable about a central axis, wherein the first rotor system comprises at least two monolithic blades stacked vertically along the central axis, each monolithic blade comprising three scoops positioned in a +y-direction relative to a central x-z plane and arranged about 120° relative to one another and three scoops positioned in a-y-direction relative to a central x-z plane and arranged about 120° relative to one another, wherein the scoops above and below the plane are offset by about 60° relative to one another, and wherein the scoops are shaped such that fluid can push on each scoop, and (b) a second rotor system positioned in an annular region surrounding the first rotor system in the central region, wherein the second rotor system comprises a plurality of second blades equiangularly spaced about the central axis, wherein each of the second blades is positioned substantially parallel to the central axis, wherein the cross-section of the second blade is a substantially symmetrical airfoil shape. In some embodiments, each of the plurality of second blades are attached to at least one blade-set of the first rotor system using at least two supporting struts. In some embodiments, each of the plurality of second blades are attached to the shaft using at least two supporting struts.

Since the EnergyMaster system is based on a floating system, it will be unavoidably affected by wave motion. In some embodiments, the MS rotor used in the second HDMS VAT is selected based on the ability to effectively absorb wave energy. In some embodiments, the MS rotor used in the second HDMS VAT is the Marilyn blade.

The Floatable Foundation and Other Teachings

The floatable foundation (FF) comprises a structure that is designed to float in a body of water, such that the first HDMS VAT is positioned above the surface of the water so that it can capture wind energy and the second HDMS VAT is positioned below the surface of the water so that it can capture the tidal/wave energy.

The floatable foundation can be made of any suitable material that allows the floatable hybrid tidal/wave/wind energy harvesting system to float in/on a body of water including, but not limited to, at least one of ethylene vinyl acetate (EVA), poly ethylene-vinyl acetate (PEVA), plastazote, latex rubber, polyurethane (PU), polystyrene (PS), expanded polystyrene (EPS), extruded polystyrene foam (XTR or XPS), acrylonitrile butadiene styrene (ABS), polypropylene (PP), polyethylene (PE), rubber, silicone, thermoplastic polymer, hydromorphic polymers, polymeric material or other suitable material that can float in water. In some embodiments, the FF structure comprises at least one hollow section for placement of gearboxes, generators, and computer chips therein (see, e.g., FIG. 1D). The devices needed for converting kinetic energy to mechanical energy and mechanical energy to electrical energy to be included in the floatable foundation are well known to the person skilled in the art.

The production of the floatable foundation can be done using an injection molding process, a compression molding process, an extrusion process, or some other method to create the FF.

Advantageously, the floatable foundation is designed with stability in mind. Consequently, it has its own buoyancy and can further comprise an intended water line. The intended water line preferably is arranged in such a way that the mechanically rotating parts of the first HDMS VAT and the second HDMS VAT remain at the same level above and below the water line, respectively.

Although shown as one circular disc in FIGS. 1A and 1B, the floatable foundation is not intended to be limited as such. For example, the floatable foundation can comprise a series of hulls that are rigidly or non-rigidly connected to one another, wherein at least one hull comprises a hollow section for placement of gearboxes and generators therein. In one embodiment, the gearboxes and generators for both the first and second HDMS VAT are located in one hull. In one embodiment, the gearbox and generator for the first HDMS VAT are located in one hull while the gearbox and generator for the second HDMS VAT are located in another hull.

In some embodiments, the floatable foundation further comprises floating stabilizers or some other floatable projecting structure, which act similar to outriggers to stabilize the floatable hybrid tidal/wave/wind energy harvesting system (see, e.g., FIGS. 1B and 1C).

In some embodiments, the floatable hybrid tidal/wave/wind energy harvesting system is moored to a structure in or on the body of water (e.g., a buoy or anchor) or to the floor of the body of water. For example, the floatable hybrid tidal/wave/wind energy harvesting system can be moored, using wires, or some equivalent thereof, that are attached to the floor of the body of water (see, e.g., FIG. 1B).

In some embodiments, multiple floatable hybrid tidal/wave/wind energy harvesting systems are connected to one another, either rigidly or non-rigidly, to create an "island" of energy harvesting systems.

In some embodiments, the floatable hybrid tidal/wave/wind energy harvesting system further comprises at least one light or other tracking device positioned on the first HDMS VAT, the second HDMS VAT, or both wherein the at least one light or other tracking device is used to see the HDMS VATs or find them using, for example, a GPS tracker.

Accordingly, in some embodiments, the floatable foundation comprises a structure comprising at least one hollow section, wherein the structure floats on water and wherein the at least one hollow section houses critical systems, including but not limited to, at least one gearbox, at least one generator and at least one computing device for converting kinetic energy captured by the first HDMS VAT, the second HDMS VAT, or both, into mechanical energy.

Figure 12A:
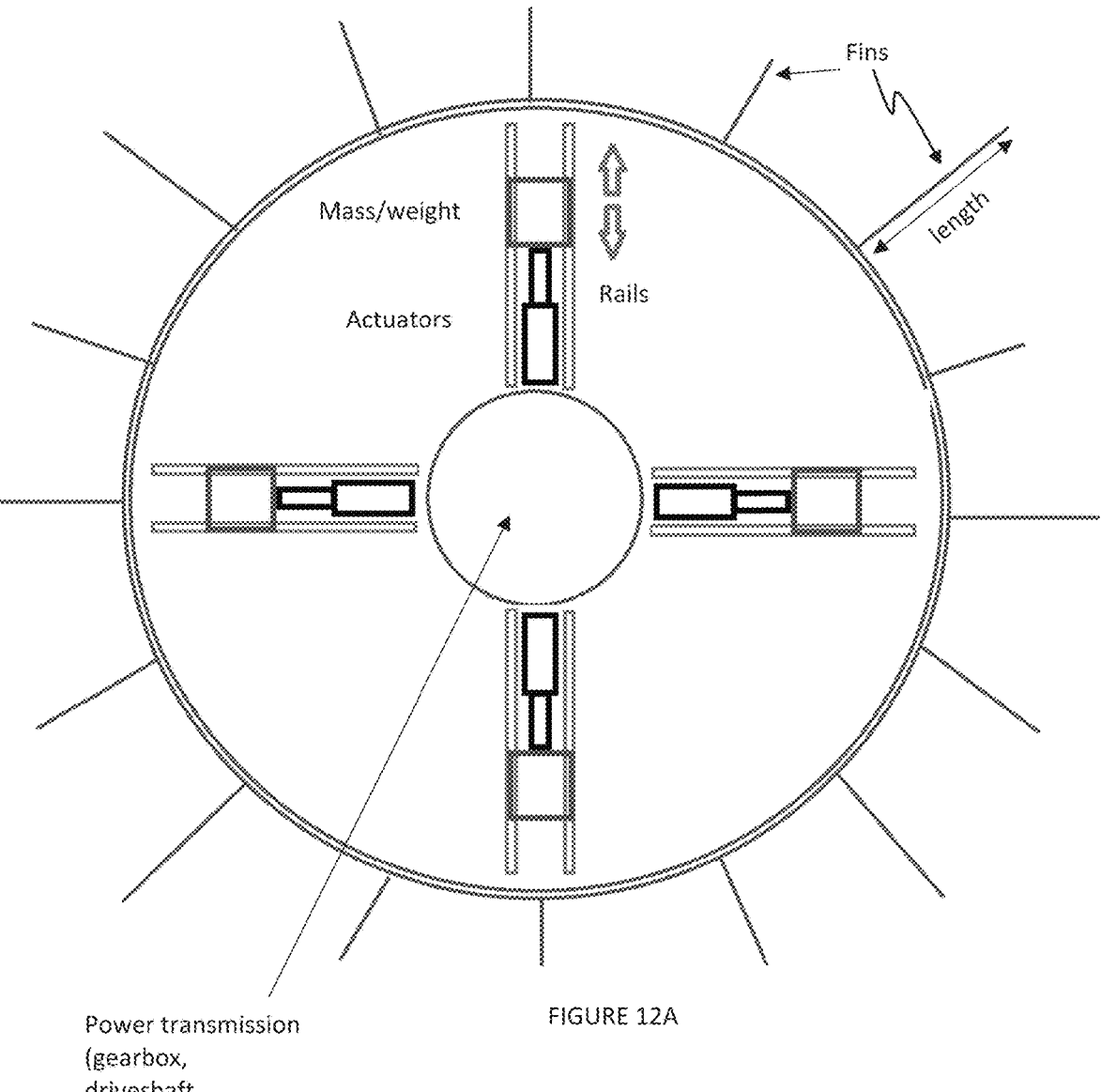
FIG. 12A. An illustration of one embodiment of the floatable foundation, viewing into the interior from above, including the positioning of the power transmission and the sensors/actuators and masses to reduce tilting.
Figure 12B:
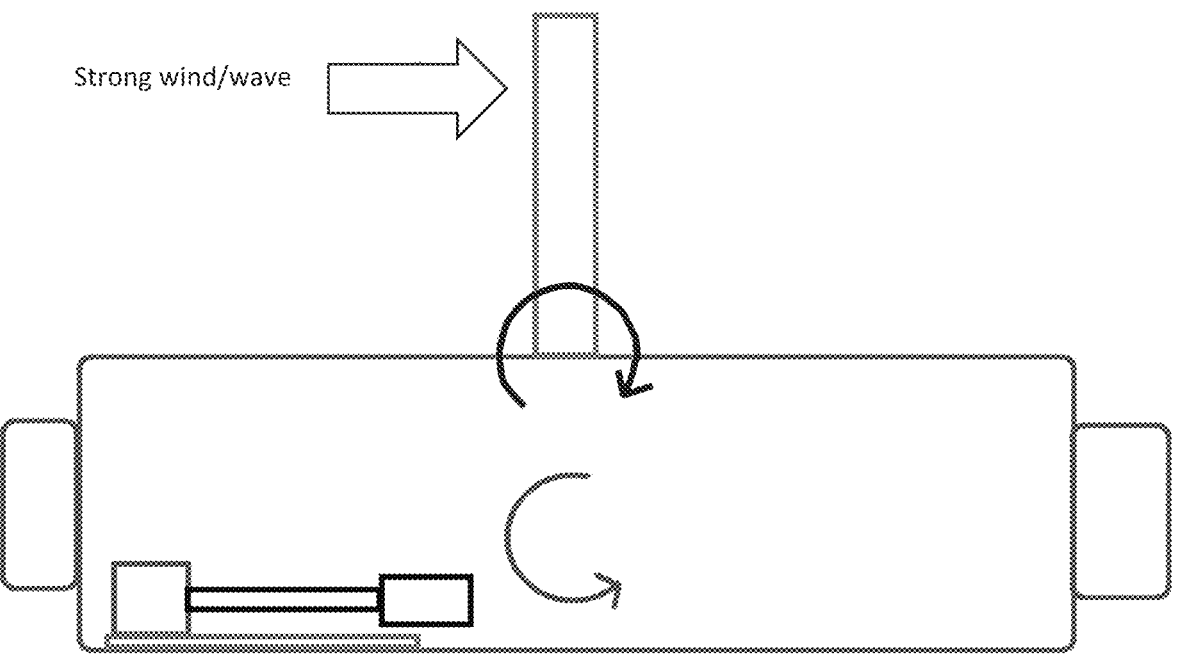
FIG. 12B. An illustration of one embodiment of the interior of the floatable foundation, viewing into the interior from a side, including the positioning of the sensors/actuators and masses to reduce tilting.

In some embodiments, the floatable foundation further comprises its own sensors and actuators to minimize tilting of the foundation. For example, in some embodiments, the floatable foundation utilizes a low impedance output accelerometer connected to a control board to detect if the entire structure is tilting. The accelerometer can work in tandem with an anemometer to control a hybrid mass damper (HMD) system to reduce tilting. The anemometer anticipates the foundation's tilt direction and magnitude based on the wind/tidal speed and direction, while the accelerometer verifies the information (similar to excessive RPM verification). If tilting is confirmed, the HMD actuators can push and pull their respective masses along rails in the corresponding directions to stabilize the foundation. To achieve this, high speed linear actuators capable of sufficient force output can be used, and there must also be some angular threshold for activation. An example of the placement of the sensors/actuators and masses in the floatable foundation are shown in FIGS. 12A and 12B. It should be appreciated that although four sensor/actuator/mass mechanisms are shown in FIGS. 12A and 12B, more or less can be used depending on the shape and size of the floatable foundation, as readily understood by the person skilled in the art.

In some embodiments, the floatable foundation further comprises at least one fin positioned on the circumference or outer wall of the floatable foundation (see, e.g., FIG. 12A). Without being bound by theory, it is believed that the fins damp the rotational torque of the floating system with hydrodynamic drags. The floatable foundation can include 1, 2, 3, 4, 5, 6, 7, 8, 9, 10, 11, 12, 13, 14, 15, 16, 17, 18, 19, 20, or more fins, wherein the length of the fins can be the same as or different from one another.

The features and advantages of the invention are more fully illustrated by the following non-limiting examples, wherein all parts and percentages are by weight, unless otherwise expressly stated.

EXAMPLE 1

Simulation Models

In the present study, two dimensional (2D) computational models were adopted to analyze the performance of HDMS VAWTs. The geometric configuration of the original design is shown in FIG. 3A. Specifically, it comprised a three-bladed Darricus H-shaped rotor and a three-bladed Modi-fied-Savonius (MS) rotor. A modified NACA0015 airfoil with a round trailing edge was used for the Darrieus H-shaped rotor. The diameter D of the entire turbine varied from 0.7 m to 14 m. The chord length, c, of outer Darrieus blades varied based on the solidity of the turbine (see, FIG. 1C for a depiction of the chord length). The inner Modified-Savonius (MS) rotor blades with specially designed curvature are attached to the shaft and are 120° apart from each other. The radius of the MS rotor is equal to the chord length of the original Darrieus blade outside. The blade tip of the MS rotor is aligned with the aerodynamic center of the corresponding blade in the Darrieus rotor. In the other designs shown in FIGS. 3B-3F, the ratios between the radius of the MS rotor and the radius of the entire turbine are fixed to the value of the original design.

The solidity of the original design shown in FIG. 3A is calculated from σ=nc/(πD) as 0.1364. Meanwhile, different designs of the HDMS VAWT, as shown in FIGS. 3B-3F, were also investigated. These designs include a three-bladed turbine with double solidity compared to the original one (see, FIG. 3B); a three-bladed turbine with half solidity compared to the original one (see, FIG. 3C); a five-bladed turbine with 5/3 solidity compared to the original one (see, FIG. 3D); a six-bladed turbine with the same solidity as the original design (see, FIG. 3E); and a nine-bladed turbine with the same solidity as the original design (see, FIG. 3F). These 2D profiles can be treated as 3D VAWTs with a large height-radius (or aspect) ratio, under which scenario the blade tip effects can be neglected.

To measure the performance of VAWTs, several parameters, namely, angular velocity $\dot{\theta}$, hydrodynamic moment $M_{water}$, and power coefficient $C_{power}$, were used in this study. Once the hydrodynamic moment $M_{water}$ and the angular velocity $\dot{\theta}$ of the water turbine are obtained, the power P extracted from the water flow is calculate as follows $$P = M_{water}\dot{\theta}. \tag{1}$$

The total power in the incoming water passing across the turbine with a reference area A can be calculated using the following equation $$P_{max} = \frac{1}{2}\rho U_\infty^3 A. \tag{2}$$

Finally, the power coefficient $C_p$ is calculated as $$C_p = \frac{P}{P_{max}}. \tag{3}$$

Based on Betz's law, the maximum value of the time-averaged power coefficient $C_p$ is 59.3% in a single-phase open flow.

Energy Harvesting Performance Analysis of HDMS VAWTs

A. Performance Analysis of the Original HDMS VAWT Design

Researchers [13, 14] have already demonstrated that the motor-driven turbine (i.e., a turbine with the prescribed motion) can reproduce the physics of a wind-driven turbine under certain conditions. Therefore, to precisely control the TSR with different freestream velocities, the prescribed motion approach was adopted. Herein, the VAWT simulations were conducted with various freestream velocities $U_\infty$ from 0.25 m/s to 3.5 m/s, which lead to the Reynolds number Re=$\rho U_\infty D/\mu$ from 3.48×10⁵ to 4.88×10⁶. The TSR was set to 2.0, 2.5 and 3.0 for each freestream velocity, respectively.

FIG. 4 shows the relationship between the power coefficient $C_p$ of the original design of the HDMS turbine (see FIG. 3A, having a turbine diameter D=1.4 m) and the $U_\infty$(and the corresponding Re) together with TSRs in the single-phase water flow. Note that unless specifically mentioned, the power coefficient $C_p$ is for the entire turbine comprising the Darrieus and Modified-Savonius rotors. From FIG. 4, it can be seen that the inner Savonius rotor contributes little to the total power harvesting performance for all cases with different $U_\infty$ and TSRs. Specifically, the absolute value of the $C_p$ contributed by the inner Savonius rotor is relatively insignificant (about 1% or less) compared to the total $C_p$ created by both the Darrieus and Modified-Savonius rotors. Thus, the effect of the inner Savonius rotor on the total energy harvesting performance is negligible and the total energy harvesting performance is dominated by the outer Darrieus blades. The similar phenomenon has been observed for wind turbines [13]. This evidences that the purpose of the inner Modified-Savonius design is to assist with self-starting the turbine.

Figure 5A:
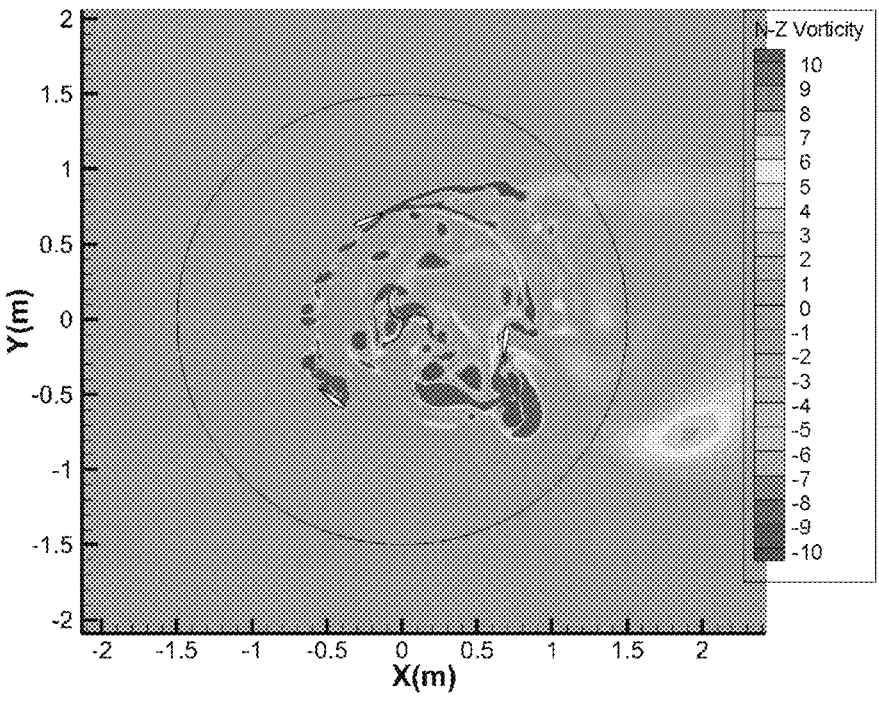
FIG. 5A. Normalized vorticity fields in the z direction of the original HDMS turbine design when $U_\infty$=0.25 m/s and TSR=2.0.
Figure 5B:
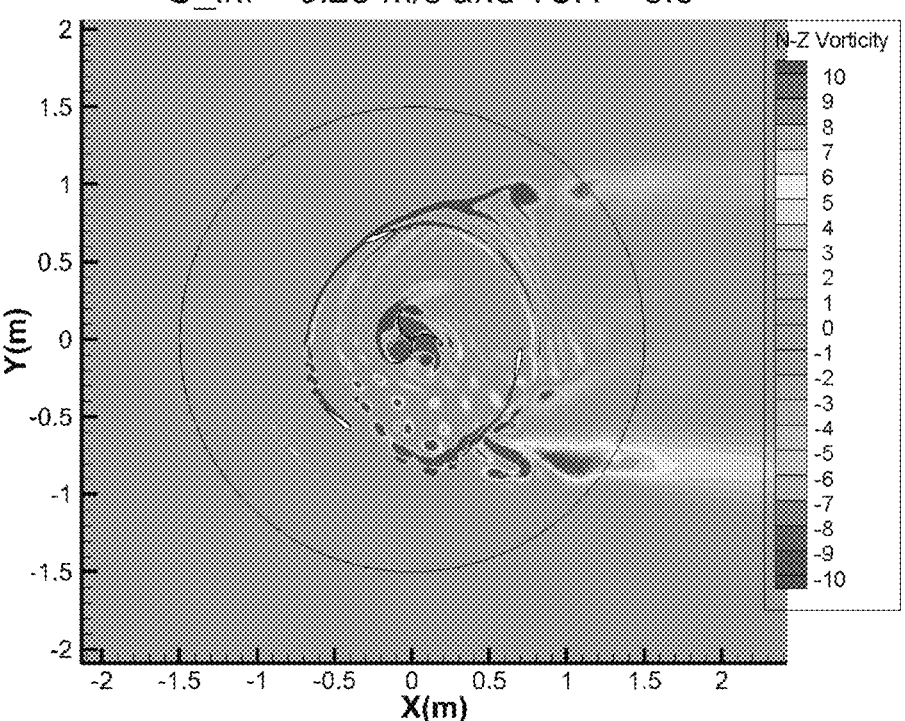
FIG. 5B. Normalized vorticity fields in the z direction of the original HDMS turbine design when $U_\infty$=0.25 m/s and TSR=3.0.

It can also be seen in FIG. 4 that when the freestream velocity $U_\infty$ is 0.25 m/s, the $C_p$ obtained by using TSR=2.0 has the lowest value (7.6%) compared to the $C_p$ using the other two TSRs. Meanwhile, the $C_p$ obtained by using TSR=3.0 has the highest value compared to the other two cases. The reason is that the relatively low $U_\infty$ and TSR lead to dynamic stall over the outer Darrieus blades as shown in FIG. 5A (see, e.g., the severe flow separation over the Darrieus blade in the southwest). This dynamic stall can significantly decrease the hydrodynamic moment acting on the Darrieus turbines. Therefore, the total energy harvesting performance at TSR=2.0 is worse than that at the other two TSRs when $U_\infty$=0.25 m/s. From FIGS. 5A and 5B, which shows the flow field of the normalized vorticity in the z direction, we find that the Darrieus blade in the southwest of the case with $U_\infty$=0.25 m/s and TSR=2.0 (see FIG. 5A) encounters large dynamic stall. However, when the TSR reaches 3.0, as shown in FIG. 5B, the dynamic stall is suppressed over the blade at the same position. This dynamic stall mitigation is due to the decrease of angles of attack (AoAs) resulted by the relatively high TSR. For example, the local AoA of the Darrieus blade in the southwest in FIGS. 5A and 5B is decreased from 28.68° in FIG. 5A to 17.14° in FIG. 5B.

The values of $C_p$ under different U., and TSR conditions are documented in Table 1. Combining Table 1 and FIG. 4, it was discovered that, for the original HDMS turbine design, there exists an optimal Reynolds number range near Re=4.17×10⁶ for operation, no matter what TSR was used. It was also observed that when the freestream flow speed was fixed, there exists an optimal TSR around 2.5. Specifically, when $U_\infty$, is greater than 0.25 m/s, all cases with TSR=2.5 have the highest $C_p$ compared to the cases with the other two TSRs. The maximum $C_p$ obtained from this study is 51.77% when TSR=2.5 and $U_\infty$=3.0 m/s (equivalently, Re=4.17×10⁶). Note that this value is over 80% of Betz's limit.

TABLE 1

| Power coefficients of the original HDMS turbine design with various $U_\infty$ and TSRs. | | | |
|---|---|---|---|
| | | Power Coefficient $C_p$ | |
| | Re | TSR 2.0 | TSR 2. 5 | TSR 3.0 |
| $U_\infty$ = 0.25 m/s | 3.48 × 10⁵ | 7.60% | 27.81% | 29.85% |
| $U_\infty$ = 0.50 m/s | 6.97 × 10⁵ | 29.51% | 43.62% | 36.90% |
| $U_\infty$ = 1.00 m/s | 1.39 × 10⁶ | 36.10% | 46.90% | 37.55% |
| $U_\infty$ = 1.50 m/s | 2.09 × 10⁶ | 39.00% | 49.63% | 39.37% |
| $U_\infty$ = 2.00 m/s | 2.79 × 10⁶ | 39.95% | 49.87% | 40.97% |
| $U_\infty$ = 2.50 m/s | 3.48 × 10⁶ | 43.50% | 50.30% | 41.40% |
| $U_\infty$ = 3.00 m/s | 4.17 × 10⁶ | 50.21% | 51.77% | 41.64% |
| $U_\infty$ = 3.50 m/s | 4.88 × 10⁶ | 50.01% | 51.33% | 41.31% |

Figure 6A:
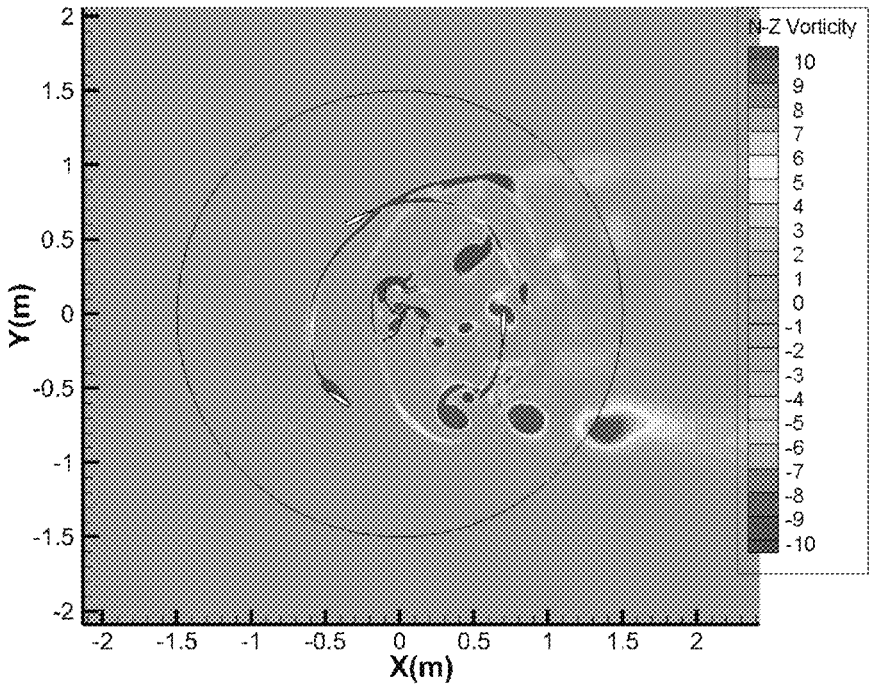
FIG. 6A. Normalized vorticity field in the z direction of the original HDMS turbine design when $U_\infty$=3.0 m/s and TSR=2.0.
Figure 6B:
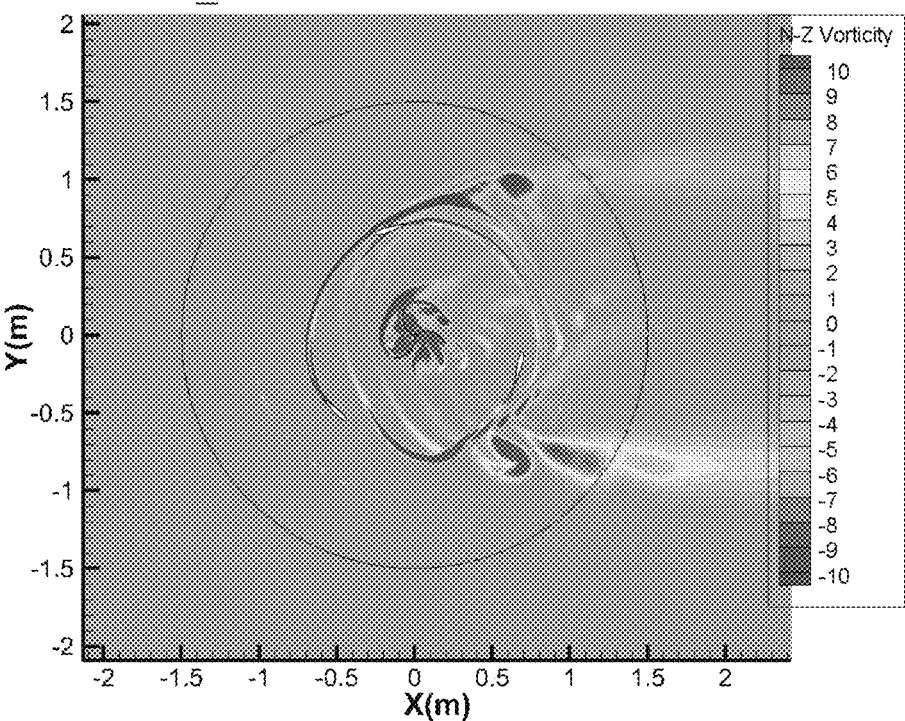
FIG. 6B. Normalized vorticity field in the z direction of the original HDMS turbine design when $U_\infty$=3.0 m/s and TSR=3.0.

FIGS. 6A-6B show the normalized vorticity fields in the z direction when $U_\infty$=3.0 m/s, for TSR=2.0 and 3.0, respectively. As seen in FIG. 6A, the flow separation is less obvious over the blade in the southwest compared to that in FIG. 5A when $U_\infty$=0.25 m/s at the same position. Obviously, the Reynolds number when $U_\infty$=3.0 m/s is about one order of magnitude larger than that when $U_\infty$=0.25 m/s. The turbulent boundary layer at higher Reynolds numbers can be more resilient to flow separation over the Darrieus blades. From FIG. 6B, it was observed that the higher TSR (i.e., 3.0) can further suppress the flow separation over the turbine blades; however, as seen in Table 1, the power coefficient decreases. This is closely related to the variation of local AoAs of the Darrieus blades, which determines the variation of the lift force on the blades. Specifically, within the stall AoA, the suppression of leading-edge vortices indicates small lift generation on the blades, causing a performance penalty on the turbine.

B. Performance Analysis of Different Designs of the HDMS VAWT

To further investigate the relationship between the Reynolds number and the power coefficient $C_p$, the size of the original HDMS VAWT design was scaled up or down with the same solidity. Five diameters, namely, D=0.7 m, D=1.4 m, D=2.8 m, D=5.6 m and D=14.0 m, were studied. The freestream velocity $U_\infty$, and TSR were fixed to 2.5 m/s and 2.5, respectively.

Figure 7:
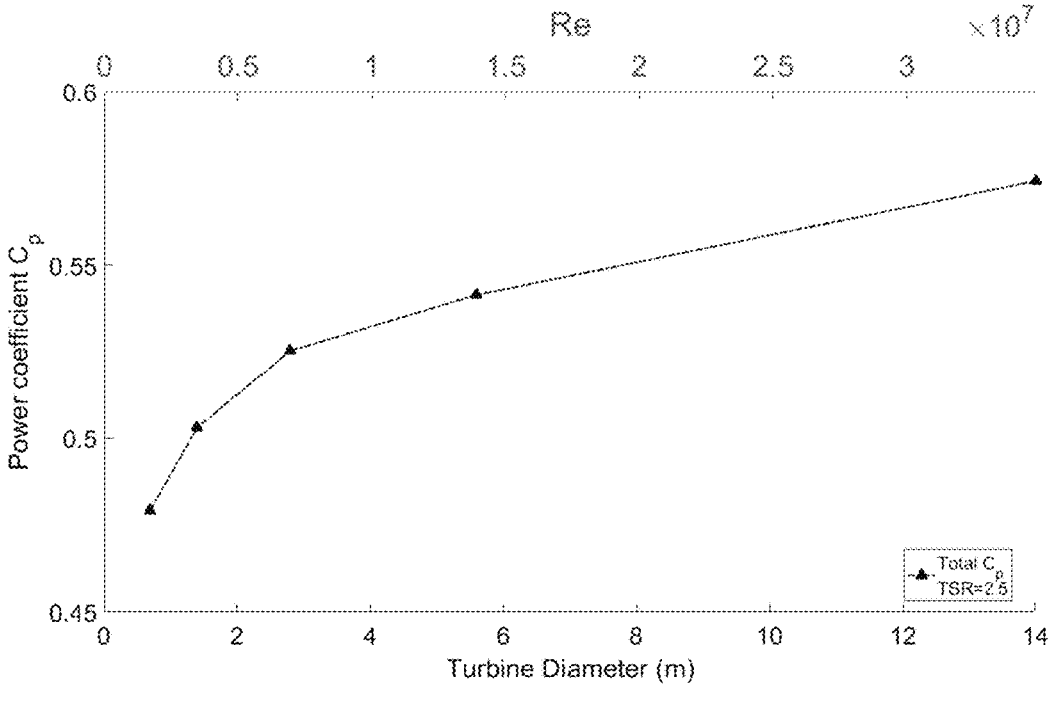
FIG. 7. Relationship between the power coefficient and the size of HDMS VAT when $U_\infty$=2.5 m/s and TSR=2.5.
Figure 8:
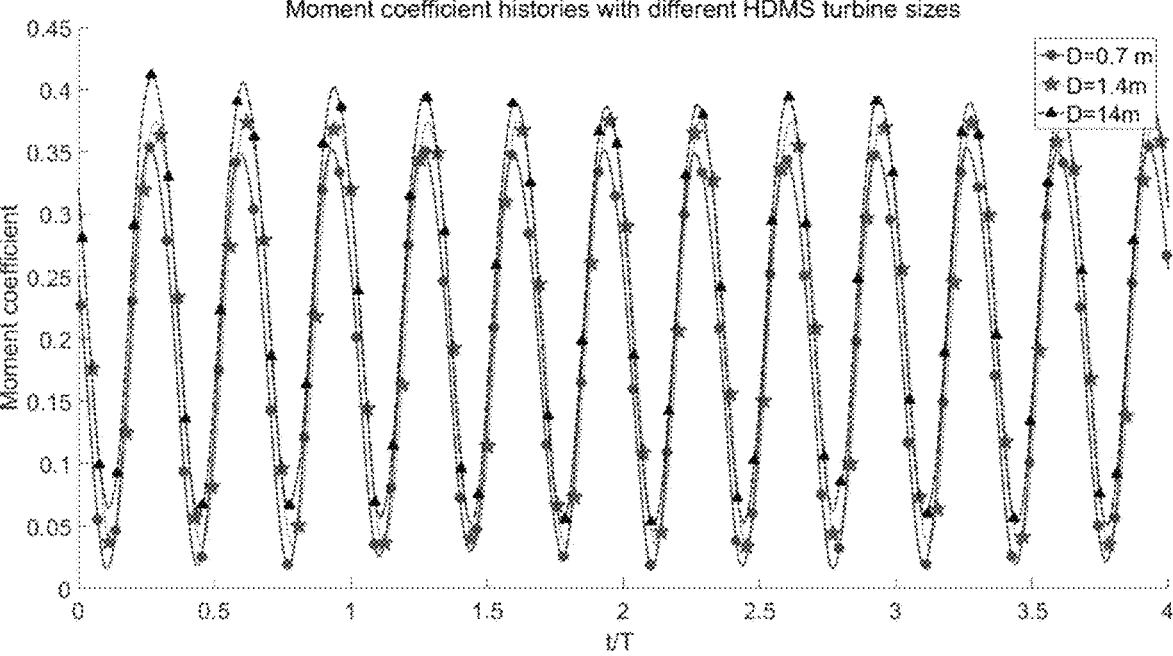
FIG. 8. Moment coefficient Cm histories when $U_\infty$=2.5 m/s and TSR=2.5 with different turbine sizes.
Figure 9A:
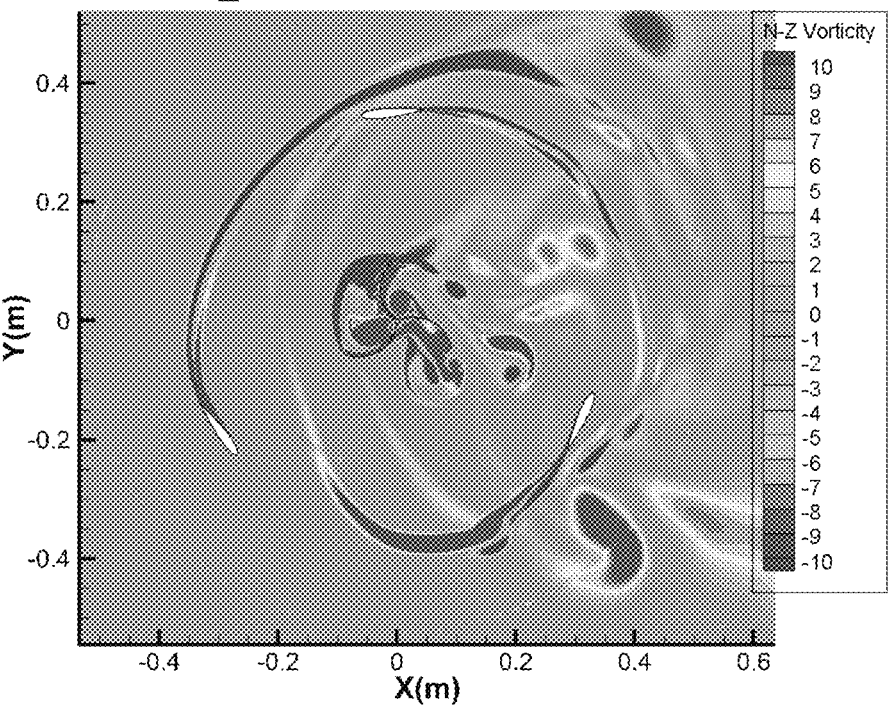
FIG. 9A. Normalized vorticity fields in the z direction around the HDMS turbines with the diameter D=0.7 m when $U_\infty$=2.5 m/s and TSR=2.5.
Figure 9B:
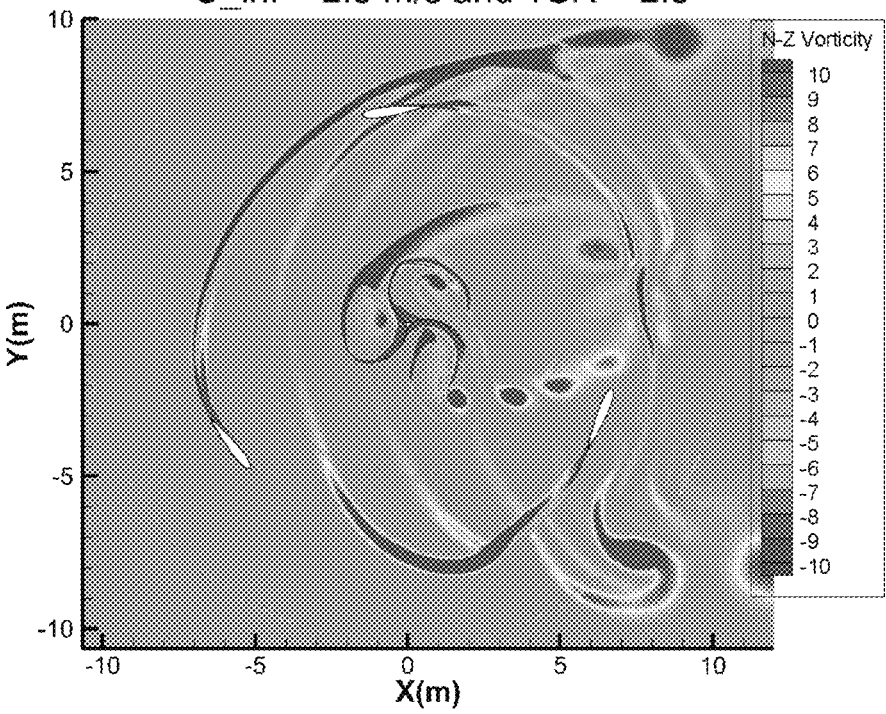
FIG. 9B. Normalized vorticity fields in the z direction around the HDMS turbines with the diameter D=14 m when $U_\infty$=2.5 m/s and TSR=2.5.
Figure 10A:
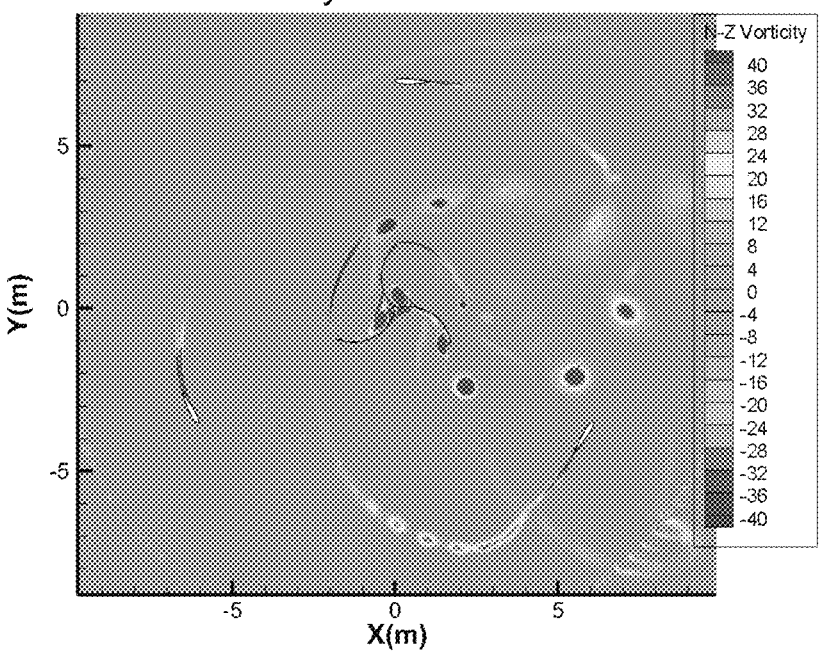
FIG. 10A. Normalized vorticity fields in the z direction around the HDMS turbine when D=14 m, $U_\infty$=2.5 m/s and TSR=2.5 with half solidity compared to the original design.
Figure 10B:
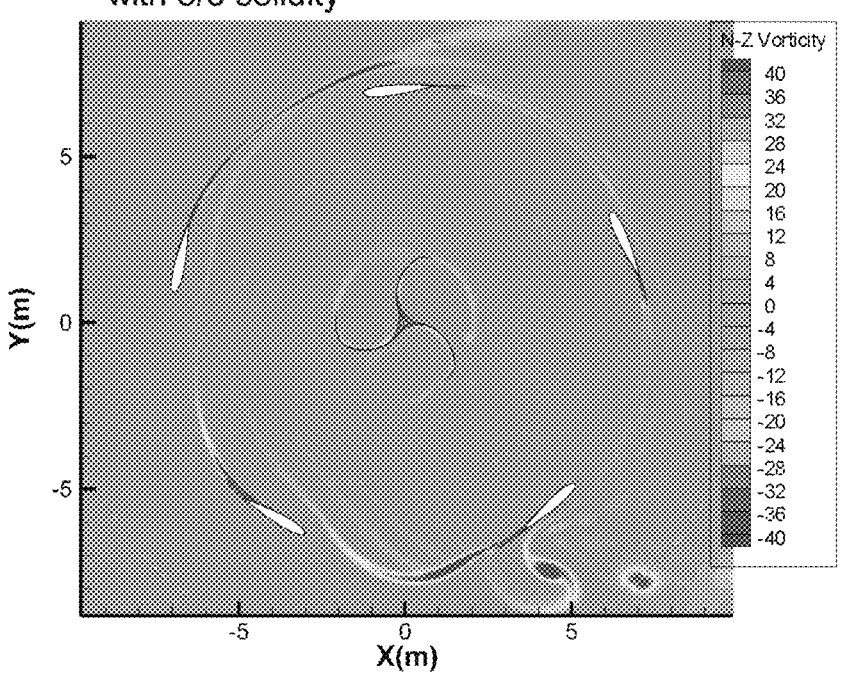
FIG. 10B. Normalized vorticity fields in the z direction around the HDMS turbine when D=14 m, $U_\infty$=2.5 m/s and TSR=2.5 with 5/3 solidity compared to the original design.
Figure 10C:
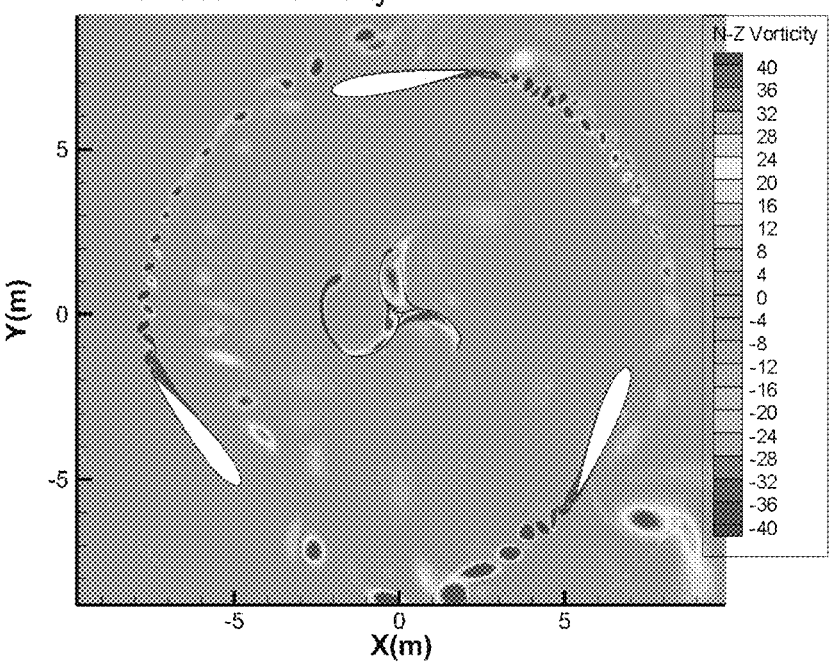
FIG. 10C Normalized vorticity fields in the z direction around the HDMS turbine when D=14 m, $U_\infty$=2.5 m/s and TSR=2.5 with double solidity compared to the original design.
Figure 11A:
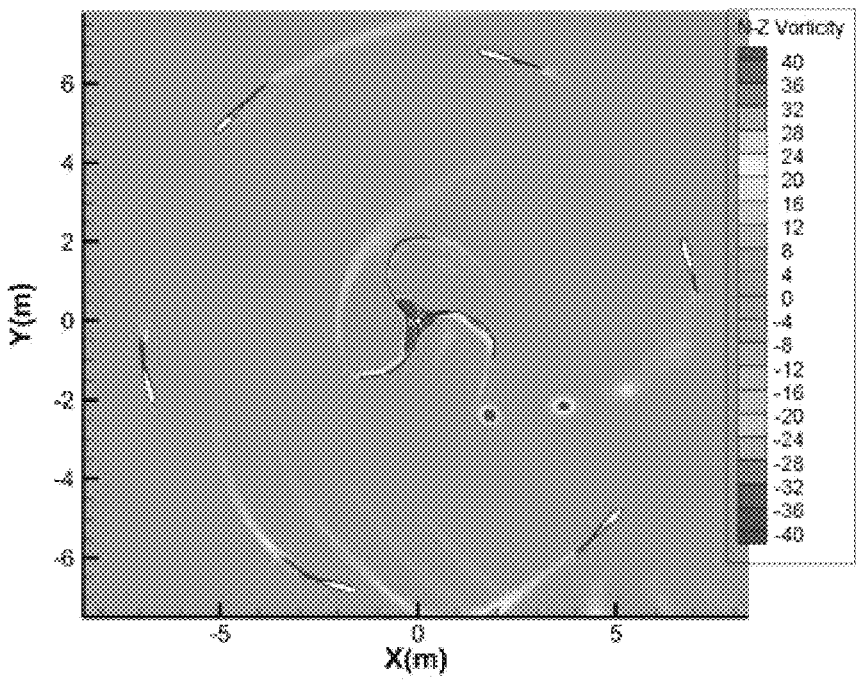
FIG. 11A. Normalized vorticity fields in the z direction around the six-bladed HDMS turbine when D=14 m, $U_\infty$=2.5 m/s and TSR=2.5 with the same solidity but different configurations as FIG. 11B.
Figure 11B:
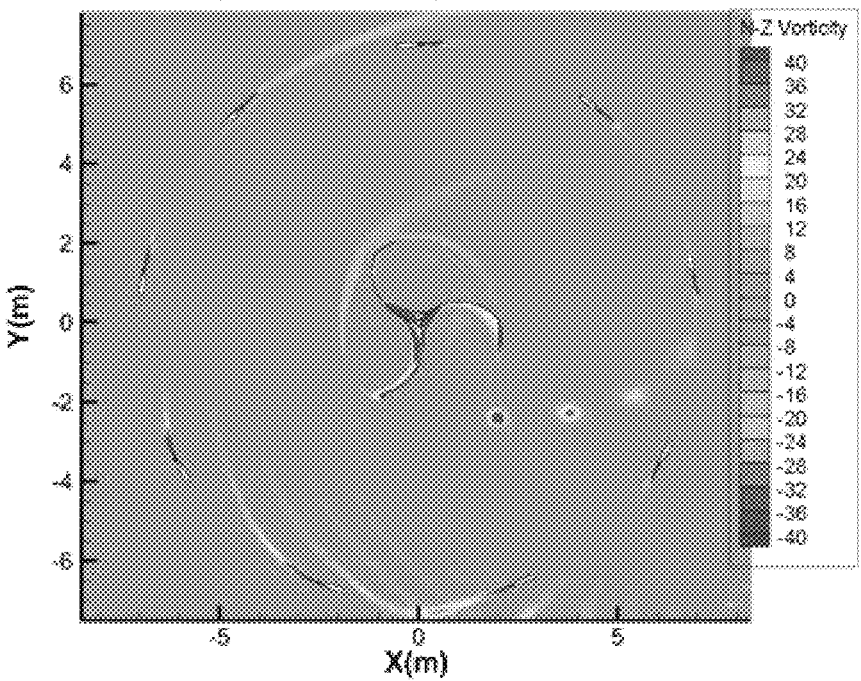
FIG. 11B. Normalized vorticity fields in the z direction around the nine-bladed HDMS turbine when D=14 m, $U_\infty$=2.5 m/s and TSR=2.5 with the same solidity but different configurations as FIG. 11A.

FIG. 7 shows the relationship between the power coefficient and the sizes of different HDMS VAWTs when $U_\infty$=2.5 m/s and TSR=2.5, and Table 2 presents the values of the $C_p$. It was observed that the power coefficient $C_p$ increases while the diameter of the turbine is enlarged. When the diameter D reaches 14.0 m, which is 10 times as that of the original HDMS VAWT design, the $C_p$ is 57.42%. This value is close to Betz's limit. Thus, increasing the Reynolds number by enlarging the turbine size can also result in higher power coefficients. Pursuant the foregoing discussions, this is related to stronger resistance of high-Reynolds-number turbulent boundary layers to large-scale flow separation over the Darrieus blades. FIG. 8 presents the moment coefficient Cm histories with the turbine size of D=0.7 m, D=1.4 m and D=14.0 m. It was discovered that the Cm histories for the cases with larger turbine sizes are consistently shifted toward larger values. FIGS. 9A-9B show the flow fields of the normalized vorticity in the z direction when D=0.7 m and D=14 m, respectively. It was observed that although the sizes of the two turbines are very different, the flow fields near the outer Darrieus blades are similar; however, flow separation over the blade in the southwest when D=14 m is further suppressed compared to that when D=0.7 m. Specifically, as observed from FIG. 9B, the separation point on the blade in the southwest when D=14 m is closer to the trailing edge of the blade, resulting in a narrower wake.

TABLE 2

Power coefficients of the HDMS VAWTs with different sizes when $U_\infty$ = 2.5 m/s and TSR = 2.5.

| D(m) | 0.7 | 1.4 | 2.8 | 5.6 | 14 |
|---|---|---|---|---|---|
| Re | $1.74 \times 10^6$ | $3.48 \times 10^6$ | $6.97 \times 10^6$ | $1.39 \times 10^7$ | $3.48 \times 10^7$ |
| $C_p$ | 47.92% | 50.30% | 52.53% | 54.14% | 57.42% |

Solidity Effects

HDMS VAWTs with different solidities were investigated in this subsection. It is noted that the solidity can be modified in three ways, namely, varying the blade size with the blade number fixed, varying the blade number with the blade size fixed, and a mix of the aforementioned two approaches. In this study, the first two approaches were employed. First, the blade number was fixed, and the size of the Darrieus blades were doubled or decreased by half. These two cases were labeled as "double solidity" (see, FIG. 3B) and "half solidity" (see, FIG. 3C). Then the blade size was fixed, and the Darrieus blade number was changed from 3 to 5. This case is labeled as "5/3 solidity" (see, FIG. 3D). The other parameters for the three turbines were set as follows: D=14 m, $U_\infty$=2.5 m/s and TSR=2.5. The results are shown in Table 3. It was observed that $C_p$'s of the three new cases cannot reach as high as that of the original design. Further, the $C_p$'s of the turbines with the 5/3 and double solidities were significantly lower than that of the original design. It is noted that in the work by Rezaeiha et al. [15], the power coefficient $C_p$ can be approximated as a function of $\sigma\lambda^3$ regardless of blade numbers. Therein, the solidity is defined as nc/D, which is I times of the present definition of $\sigma$. The optimal value of $\pi\sigma\lambda^3$ that results in the maximum $C_p$ when the turbulence intensity is 5% is about 6.0. In the present case, the factor $\pi\sigma\lambda^3$ is 6.7, very close to the optimal one. This explains why the power coefficient of the original design is much higher than those with larger or smaller solidities. The normalized vorticity fields are presented in the z direction of the three cases with different solidities in FIGS. 10A-10C. It is clear that when larger solidities are used, the Darrieus blades have more intensive (but negative) interaction with the wakes, degrading their energy harvesting performance.

TABLE 3

Power coefficients of the HDMS VAWTs with different solidities when D = 14 m, $U_\infty$ = 2.5 m/s and TSR = 2.5

| | Original | Half solidity | 5/3 solidity | Double solidity |
|---|---|---|---|---|
| $C_p$ | 57.42% | 52.92% | 42.39% | 33.46% |

Blade Number Effects

Recently, Mabrouk and Hami claimed that three-bladed Darrieus turbine configurations exhibit the best performance regarding the moment and energy production. Interestingly, in the work by Rezaeiha et al. the performance of the turbines can be irrelevant of the number of blades when power coefficient $C_p$ is measured as a function of $\sigma\lambda^3$. In this subsection, these statements were tested by studying the effect of the number of the outer Darrieus blade with the solidity of the VAWT fixed. Six-bladed and nine-bladed configurations (see, FIGS. 3E and 3F, respectively) are implemented to carry out the study. The same turbine setting as that used in the solidity effect study, i.e., the diameter D=14 m, freestream velocity $U_\infty$=2.5 m/s and TSR=2.5, is employed here. Results in Table 4 show that the $C_p$ of the six-bladed design is 55.77% and the $C_p$ of the nine-bladed design is 49.39%. Both are lower than the $C_p$ (57.42%) of the original three-bladed design with the same solidity. This shows the configuration of the original three-bladed design HDMS VAWT has the best energy harvesting performance, which agrees with the results in [16]. As observed in FIGS. 11A-11B, where the normalized vorticity fields in the z direction of the six-bladed and nine-bladed designs are shown, the inferior performance of the nine-bladed design may be attributed to intensive interaction between the blades and wakes.

TABLE 4

| Power coefficients of the HDMS VAWTs with different blade numbers when D = 14 m, U∞ = 2.5 m/s and TSR = 2.5. | | |
|---|---|---|
| | Original | Six Blades | Nine Blades |
| $C_p$ | 57.42% | 55.77% | 49.39% |

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

REFERENCES

1. S. Kerr, K. Johnson and S. Weir, "Understanding community benefit payments from renewable energy development," *Energy Policy*, vol. 105, pp. 202-211, 2017.
2. Nasab N. M$_{water}$, Kilby J., Feasibility Study: Effect of Tidal Turbines Cut-in Speed for Power Generation in New Zealand, Chemical Engineering Transactions, 88, 13-18, 2021.
3. I. Paraschivoiu, Wind Turbine Design: With Emphasis on Darrieus Concept, Presses inter Polytechnique, 2002.
4. J. R. Baker, "Features to aid or enable self starting of fixed pitch low solidity vertical axis wind turbines," *Journal of Wind Engineering and Industrial Aerodynamics*, vol. 15, pp. 369-380, 1983.
5. M. A. Kamojia, S. B. Kedarea and S. V. Prabhu, "Performance tests on helical Savonius rotors," *Renewable Energy*, vol. 34, pp. 521-529, 2009.
6. B. F. Blackwell, L. V. Feltz and R. C. Maydew, "Wind turbine". Patent U.S. Pat. No. 3,918,839 A, 1975.
7. T. M. Groth and C. A. Vogt, "Rural wind farm development: Social, environmental and economic features important to local residents," *Renewable Energy*, vol. 63, pp. 1-8, 2014.
8. "Wind energy for rural economic development," U.S. Department of Energy (DOE), Office of Energy Efficiency and Renewable Energy (EERE), DOE/GO-102004-1826, 2014.
9. A. Uihlein and D. Magagna, "Wave and tidal current energy-A review of the current state of research beyond technology," *Renewable and Sustainable Energy Reviews*, vol. 58, pp. 1070-1081, 2016.
10. E. Denny, "The economics of tidal energy," *Energy Policy*, vol. 37, pp. 1914-1924, 2009.
11. N. D. Laws and B. P. Epps, "Hydrokinetic energy conversion: Technology, research, and outlook," *Renewable and Sustainable Energy Reviews*, vol. 57, pp. 1245-1259, 2016.
12. O. Rourke, F. Boyle and A. Reynolds, "Tidal energy update 2009," *Applied Energy*, vol. 87, pp. 398-409, 2010.
13. K. Liu, M. L. Yu and W. Zhu, "Enhancing Wind Energy Harvesting Performance of Vertical Axis Wind Turbines with a New Hybrid Design: a Fluid-Structure Interaction Study," *Renewable Energy*, vol. 140, pp. 912-927, 2019.
14. D. B. Araya and J. O. Dabiri, "A comparison of wake measurements in motor-driven and flow-driven turbine experiments," *Experiments in Fluids*, vol. 56, p. 150, 2015.
15. A. Rezaeiha, H. Montazeri and B. Blocken, "Towards optimal aerodynamic design of vertical axis wind turbines: Impact of solidity and number of blades," *Energy*, vol. 165, pp. 1129-1148, 2018.
16. I. B. Mabrouk and A. E. Hami, "Effect of number of blades on the dynamic behavior of a Darrieus turbine geared transmission system," *Mechanical Systems and Signal Processing*, vol. 121, pp. 562-578, 2019.

What is claimed is:

1. A floatable hybrid wind energy and tidal or wave energy harvesting system, said system comprising:
   (i) a first hybrid Darrieus-Modified-Savonius (HDMS) vertical axis turbine (VAT), wherein the first HDMS VAT comprises a combination of a first Modified Savonius (MS) turbine about a first central axis and a first Darrieus turbine positioned in an annular region surrounding the first MS turbine;
   (ii) a second HDMS VAT; and
   (iii) a floatable foundation, wherein the floatable foundation is a structure comprising at least one hollow section, wherein the structure is defined by a first side, a second side and an outer circumferential surface such that when the floatable foundation is in/on a body of water, the first side and second side are situated above and below a surface of the water, respectively, and wherein the floatable foundation further comprises one or more fins positioned along, and approximately perpendicular to, the outer circumferential surface of the structure,
   wherein the first HDMS VAT and the second HDMS VAT are positioned on the first side and the second side of the floatable foundation, respectively.

2. The system of claim 1, wherein the first MS turbine comprises a first rotor system comprising at least two blade-sets stacked vertically along the first central axis, wherein the at least two blade-sets are mounted upon a first shaft or to a structure that rotates around the first shaft along the first central axis, and wherein the first Darrieus turbine comprises a plurality of second blades, wherein each of the second blades is attached (i) to at least one blade-set of the first rotor system, or (ii) to the first shaft or to a structure that rotates around the first shaft, using at least two supporting struts.

3. The system of claim 1, wherein the second HDMS VAT comprises a combination of a second Modified Savonius (MS) turbine about a second central axis and a second Darrieus turbine positioned in an annular region surrounding the MS turbine.

4. The system of claim 2, wherein each blade-set of the first MS turbine comprises a plurality of first blades that are equiangularly spaced about the first central axis, and wherein each first blade extends from a position proximate to the first central axis out to a position distal to the first central axis and has a semi-circular shape, an elliptical shape, or a twisted shape that allows fluid to push on a concave side of each first blade, and/or pull on a convex side of each first blade.

5. The system of claim 4, wherein each blade-set comprises three first blades.

6. The system of claim 1, wherein the first MS turbine further comprises a hydraulic brake system.

7. The system of claim 2, wherein the plurality of second blades are equiangularly spaced about the first central axis, wherein each of the second blades is positioned parallel or approximately parallel to the first central axis and wherein the second blades have a cross-section that is a symmetrical or a approximately symmetrical airfoil shape.

8. The system of claim 7, wherein the plurality of second blades are straight-bladed.

9. The system of claim 1, wherein the first HDMS VAT rotates about the first central axis in at least one of a clockwise manner or a counterclockwise manner.

10. The system of claim 1, wherein the second HDMS VAT rotates about a second central axis in at least one of a clockwise manner or a counterclockwise manner.

11. The system of claim 1, wherein critical systems selected from at least one gearbox, at least one generator, and at least one computing device are positioned within the at least one hollow section.

12. The system of claim 1, wherein sensors and/or actuators in combination with weights or masses are positioned within the at least one hollow section to stabilize the floatable foundation.

13. A method of using the floatable hybrid wind energy and tidal or wave energy harvesting system of claim 1 to convert kinetic energy to mechanical energy, said method comprising:

(i) converting kinetic wind energy to mechanical energy using the first HDMS VAT; and (ii) converting kinetic wave and/or tidal energy of a body of water to mechanical energy using the second HDMS VAT.

14. The method of claim 13, wherein the second HDMS VAT comprises a combination of a second Modified Savonius (MS) turbine about a second central axis and a second Darrieus turbine positioned in an annular region surrounding the MS turbine.

15. The system of claim 3, wherein the second Darrieus turbine comprises a plurality of third blades, equiangularly spaced about the second central axis, wherein each of the third blades is positioned parallel or approximately parallel to the second central axis and each of the second blades is attached to a second shaft or to a structure that rotates around the second shaft, using at least two supporting struts.

16. A floatable hybrid wind energy and tidal or wave energy harvesting system, said system comprising:

(i) a first hybrid Darrieus-Modified-Savonius (HDMS) vertical axis turbine (VAT);

(ii) a second HDMS VAT, wherein the second HDMS VAT comprises a combination of a second Modified Savonius (MS) turbine about a second central axis and a second Darrieus turbine positioned in an annular region surrounding the second MS turbine; and (iii) a floatable foundation, wherein the floatable foundation is a structure comprising at least one hollow section, wherein the structure is defined by a first side, a second side and an outer circumferential surface such that when the floatable foundation is in/on a body of water, the first side and second side are situated above and below a surface of the water, respectively, and wherein the floatable foundation further comprises one or more fins positioned along, and approximately perpendicular to, the outer circumferential surface of the structure, wherein the first HDMS VAT and the second HDMS VAT are positioned on the first side and the second side of the floatable foundation, respectively.

17. The system of claim 16, wherein the first HDMS VAT comprises a combination of a first Modified Savonius (MS) turbine about a first central axis and a first Darrieus turbine positioned in an annular region surrounding the first MS turbine.

18. A method of using the floatable hybrid tidal/wave/ wind energy harvesting system of claim 16 to convert kinetic energy to mechanical energy, said method comprising:

(i) converting kinetic wind energy to mechanical energy using the first HDMS VAT; and (ii) converting kinetic wave/tidal energy of a body of water to mechanical energy using the second HDMS VAT.

19. The system of claim 1, wherein the first HDMS VAT and second HDMS VAT are different from one another.

20. The system of claim 16, wherein the first HDMS VAT and second HDMS VAT are different from one another.

* * * * *